US012101622B2

(12) United States Patent
Usami et al.

(10) Patent No.: US 12,101,622 B2
(45) Date of Patent: Sep. 24, 2024

(54) SOUND REPRODUCTION METHOD, NON-TRANSITORY MEDIUM, AND SOUND REPRODUCTION DEVICE

(71) Applicant: Panasonic Intellectual Property Corporation of America, Torrance, CA (US)

(72) Inventors: Hikaru Usami, Osaka (JP); Tomokazu Ishikawa, Osaka (JP); Seigo Enomoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 204 days.

(21) Appl. No.: 17/903,301

(22) Filed: Sep. 6, 2022

(65) Prior Publication Data

US 2022/0417696 A1 Dec. 29, 2022

Related U.S. Application Data

(63) Continuation of application No. PCT/JP2021/011244, filed on Mar. 18, 2021.

(Continued)

(30) Foreign Application Priority Data

Nov. 2, 2020 (JP) ................................ 2020-183489

(51) Int. Cl.
*H04S 7/00* (2006.01)
*H04S 1/00* (2006.01)

(52) U.S. Cl.
CPC .............. *H04S 7/303* (2013.01); *H04S 1/007* (2013.01); *H04S 7/307* (2013.01); *H04S 2400/11* (2013.01); *H04S 2400/13* (2013.01)

(58) Field of Classification Search
CPC .......... H04S 7/303; H04S 1/007; H04S 7/307; H04S 2400/11; H04S 2400/13

(Continued)

(56) References Cited

U.S. PATENT DOCUMENTS

| | | | |
|---|---|---|---|
| 2005/0244010 A1 | 11/2005 | Kuwahara et al. | |
| 2014/0133683 A1 | 5/2014 | Robinson et al. | |

(Continued)

FOREIGN PATENT DOCUMENTS

| | | |
|---|---|---|
| JP | 2005-287002 | 10/2005 |
| JP | 2014-522155 | 8/2014 |
| WO | 2013/006338 | 1/2013 |

OTHER PUBLICATIONS

International Search Report issued Jun. 1, 2021 in International (PCT) Application No. PCT/JP2021/011244.

*Primary Examiner* — William A Jerez Lora
(74) *Attorney, Agent, or Firm* — Wenderoth, Lind & Ponack, L.L.P.

(57) ABSTRACT

A sound reproduction method includes: obtaining a first audio signal indicating a first sound which arrives at a listener from a first range and a second audio signal indicating a second sound which arrives at the listener from a predetermined direction; when the first range and the predetermined direction are determined to be included in a second range which is a back range relative to a front range in the direction that the head part of the listener faces, performing a correction process on at least one of the first audio signal or the second audio signal so that intensity of the second audio signal becomes higher than intensity of the first audio signal; and performing mixing of the at least one of the first audio signal or the second audio signal, and outputting, to an output channel, the first and second audio signals.

12 Claims, 14 Drawing Sheets

Related U.S. Application Data

(60) Provisional application No. 62/991,881, filed on Mar. 19, 2020.

(58) Field of Classification Search
USPC ............................ 381/1, 2, 56, 58, 124, 303
See application file for complete search history.

(56) References Cited

U.S. PATENT DOCUMENTS

| | | | | |
|---|---|---|---|---|
| 2014/0270183 | A1* | 9/2014 | Luna | H04S 7/30<br>381/17 |
| 2016/0127847 | A1* | 5/2016 | Shi | H04S 7/301<br>381/23 |
| 2018/0302738 | A1* | 10/2018 | Di Censo | G06F 3/011 |
| 2019/0335290 | A1* | 10/2019 | Laaksonen | G02B 27/017 |
| 2023/0282339 | A1* | 9/2023 | Flexman | G16H 40/67<br>381/56 |

* cited by examiner

SOUND REPRODUCTION METHOD, NON-TRANSITORY MEDIUM, AND SOUND REPRODUCTION DEVICE

CROSS REFERENCE TO RELATED APPLICATIONS

This is a continuation application of PCT International Application No. PCT/JP2021/011244 filed on Mar. 18, 2021, designating the United States of America, which is based on and claims priority of Japanese Patent Application No. 2020-183489 filed on Nov. 2, 2020 and priority of U.S. Provisional Patent Application No. 62/991,881 filed on Mar. 19, 2020. The entire disclosures of the above-identified applications, including the specifications, drawings and claims are incorporated herein by reference in their entirety.

FIELD

The present disclosure relates to a sound reproduction method, etc.

BACKGROUND

Patent Literature 1 discloses a technique relating to a stereophonic sound reproduction system which reproduces realistic sounds by outputting sounds from speakers arranged around a listener.

CITATION LIST

Patent Literature

PTL 1: Japanese Unexamined Patent Application Publication No. 2005-287002

SUMMARY

Technical Problem

A human (here, a listener who listens to sounds) has a lower level of perception of a sound which arrives from behind the listener than a level of perception of a sound which arrives from front of the listener among sounds which arrive at the listener from regions located around the listener.

In view of this, the present disclosure has an object to provide a sound reproduction method which increases the level of perception of a sound which arrives from behind a listener.

Solution to Problem

A sound reproduction method according to an aspect of the present disclosure includes: obtaining a first audio signal and a second audio signal, the first audio signal indicating a first sound which arrives at a listener from a first range which is a predetermined angle range, the second audio signal indicating a second sound which arrives at the listener from a predetermined direction; obtaining direction information which is information about a direction that a head part of the listener faces; performing a correction process when the first range and the predetermined direction are determined to be included in a second range based on the direction information obtained, the second range being a back range relative to a front range in the direction that the head part of the listener faces, the correction process being performed on at least one of the first audio signal obtained or the second audio signal obtained so that intensity of the second audio signal becomes higher than intensity of the first audio signal; and performing mixing of the at least one of the first audio signal or the second audio signal which has undergone the correction process, and outputting, to an output channel, the first audio signal and the second audio signal which have undergone the mixing.

A sound reproduction method according to an aspect of the present disclosure includes: obtaining a plurality of first audio signals and a second audio signal, the plurality of first audio signals indicating a plurality of first sounds which arrive at a listener from a plurality of first ranges which are a plurality of predetermined angle ranges, the second audio signal indicating a second sound which arrives at the listener from a predetermined direction; obtaining direction information which is information about a direction that a head part of the listener faces; performing a correction process when the plurality of first ranges and the predetermined direction are determined to be included in a second range based on the direction information obtained, the second range being a back range relative to a front range in the direction that the head part of the listener faces, the correction process being performed on at least one of (i) the plurality of first audio signals obtained or (ii) the second audio signal obtained so that intensity of the second audio signal becomes higher than intensity of the plurality of first audio signals; and performing mixing of the at least one of (i) the plurality of first audio signals or (ii) the second audio signal which has undergone the correction process, and outputting, to an output channel, the plurality of first audio signals and the second audio signal which have undergone the mixing. The plurality of first sounds are sounds collected respectively from the plurality of first ranges.

A non-transitory medium according to an aspect of the present disclosure is a medium having a computer program recorded thereon for causing a computer to execute any of the above sound reproduction methods.

A sound reproduction device according to an aspect of the present disclosure includes: a signal obtainer which obtains a first audio signal and a second audio signal, the first audio signal indicating a first sound which arrives at a listener from a first range which is a predetermined angle range, the second audio signal indicating a second sound which arrives at the listener from a predetermined direction; an information obtainer which obtains direction information which is information about a direction that a head part of the listener faces; a correction processor which performs a correction process when the first range and the predetermined direction are determined to be included in a second range based on the direction information obtained, the second range being a back range relative to a front range in the direction that the head part of the listener faces, the correction process being performed on at least one of the first audio signal obtained or the second audio signal obtained so that intensity of the second audio signal becomes higher than intensity of the first audio signal; and a mixing processor which performs mixing of the at least one of the first audio signal or the second audio signal which has undergone the correction process, and outputting, to an output channel, the first audio signal and the second audio signal which have undergone the mixing.

Furthermore, these general and specific aspects may be implemented using a system, a device, a method, an integrated circuit, a computer program, or a non-transitory computer-readable medium such as a CD-ROM, or any combination of systems, devices, methods, integrated circuits, computer programs, or computer-readable media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The sound reproduction methods, etc., according to aspects of the present disclosure make it possible to increase the perception level of a sound which arrives from behind a listener.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
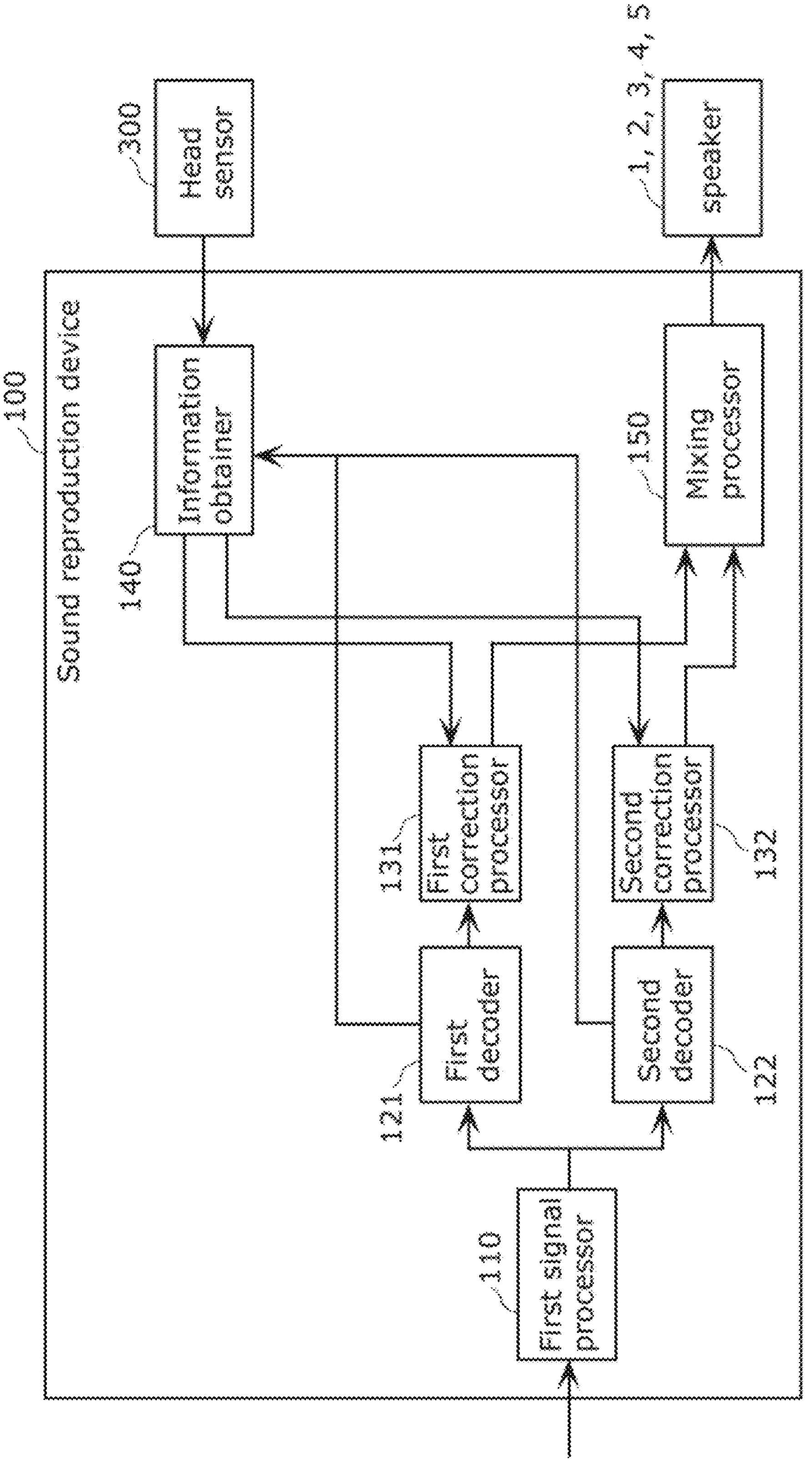
FIG. 1 is a block diagram illustrating a functional configuration of a sound reproduction device according to Embodiment 1.

Underlying Knowledge Forming Basis of the Present Disclosure

A technique that relates to sound reproduction for realizing realistic sounds by causing speakers arranged around a listener to output sounds indicated by mutually different audio signals have been conventionally known.

For example, a stereophonic sound reproduction system disclosed in PTL 1 includes a main speaker, surround speakers, and a stereophonic sound reproduction device.

The main speaker amplifies a sound indicated by a main audio signal at a position within a directivity angle with respect to a listener, each of the surround speakers amplifies a sound indicated by a surround audio signal toward walls of a sound field space, and the stereophonic sound reproduction device causes each of the speakers to amplify the sound that is output by the speaker.

Furthermore, the stereophonic sound reproduction device includes a signal adjusting means, a delay time adding means, and an output means. The signal adjusting means adjusts frequency characteristics of each of the surround audio signals, based on a propagation environment at the time of the amplification. The delay time adding means adds delay time corresponding to the surround audio signal to the main audio signal. The output means outputs the main audio signal with the added delay time to the main speaker, and outputs the adjusted surround audio signal to each of the surround speakers.

Such a stereophonic sound reproduction device enables creation of a sound field space which can provide a highly realistic sound.

By the way, a human (a listener who receives a sound here) has a lower perception level of a sound which arrives at a listener from behind the listener than a perception level of a sound which arrives at the listener from front of the listener among sounds which arrive at the listener from regions located around the listener. For example, a human has perception characteristics (more specifically, auditory perception characteristics) that the human has difficulty in perceiving the position or direction of a sound that arrives at listener L from behind listener L. The perception characteristics stem from the shapes of auricula and the difference limen of a human.

Furthermore, when two kinds of sounds (for example, an object sound and an ambient sound) arrive at the listener from behind the listener, one of the sounds (for example, the object sound) may be mixed in the other sound (for example, the ambient sound) so that the object sound cannot be perceived clearly. In this case, the listener has difficulty in perceiving the object sound which arrives at the listener from behind the listener, and thus it is difficult for the listener to perceive the position and direction of the object sound.

As one example, also in the stereophonic sound reproduction device disclosed in PTL 1, when a sound indicated by a main audio signal and a sound indicated by each of surround audio signals arrive at a listener from behind the listener, it is difficult for the listener to perceive the sound indicated by the main audio signal. For this reason, there have been demands for sound reproduction methods, etc., for increasing perception levels of sounds which arrive at listeners from behind the listeners.

In view of this, a sound reproduction method according to an aspect of the present disclosure includes obtaining a first audio signal and a second audio signal, the first audio signal indicating a first sound which arrives at a listener from a first range which is a predetermined angle range, the second audio signal indicating a second sound which arrives at the listener from a predetermined direction; obtaining direction information which is information about a direction that a head part of the listener faces; performing a correction process when the first range and the predetermined direction are determined to be included in a second range based on the direction information obtained, the second range being a back range relative to a front range in the direction that the head part of the listener faces, the correction process being performed on at least one of the first audio signal obtained or the second audio signal obtained so that intensity of the second audio signal becomes higher than intensity of the first audio signal; and performing mixing of the at least one of the first audio signal or the second audio signal which has undergone the correction process, and outputting, to an output channel, the first audio signal and the second audio signal which have undergone the mixing.

In this way, the intensity of the second audio signal indicating the second sound is made higher when the first range and the predetermined direction are included in the second range. For this reason, it becomes easy for the listener to listen to the second sound which arrives at the listener from a back range (that is located behind the listener) relative to a front range in the direction that the head part of the listener faces. In other words, the sound reproduction method for making it possible to increase the listener's level of perceiving the second sound which arrives at the listener from behind the listener.

As one example, when the first sound is an ambient sound and the second sound is an object sound, it is possible to prevent the object sound from being mixed in the ambient sound so that the object sound cannot be perceived clearly. In other words, the sound reproduction method for making it possible to increase the listener's level of perceiving the object sound which arrives at the listener from behind the listener is achieved.

For example, the first range is a back range relative to a reference direction which is defined based on a position of the output channel.

In this way, even when the first sound arrives at the listener from the back range relative to the reference direction, which allows the listener to listen to the second sound which arrives at the listener from behind the listener more easily.

For example, the correction process is a process of correcting one of a gain of the first audio signal obtained and a gain of the second audio signal obtained.

In this way, it is possible to correct the at least one of the first audio signal indicating the first sound and the second audio signal indicating the second sound, which allows the listener to listen to the second sound which arrives at the listener from behind the listener more easily.

For example, the correction process is at least one of a process of decreasing a gain of the first audio signal obtained or a process of increasing a gain of the second audio signal obtained.

In this way, the at least one of the process of decreasing the gain of the first audio signal indicating the first sound and the process of increasing the gain of the second audio signal indicating the second sound is performed, which allows the listener to listen to the second sound which arrives at the listener from behind the listener more easily.

For example, the correction process is a process of correcting at least one of frequency components based on the first audio signal obtained or frequency components based on the second audio signal obtained.

In this way, it is possible to correct the at least one of the frequency components based on the first audio signal indicating the first sound and the frequency components based on the second audio signal indicating the second sound, which allows the listener to listen to the second sound which arrives at the listener from behind the listener more easily.

For example, the correction process is a process of making a spectrum of frequency components based on the first audio signal obtained to be smaller than a spectrum of frequency components based on the second audio signal obtained.

In this way, the intensity of the spectrum of the frequency components based on the first audio signal indicating the first sound decreases, which allows the listener to listen to the second sound which arrives at the listener from behind the listener more easily.

For example, in the performing of the correction process, the correction process is performed based on a positional relationship between the second range and the predetermined direction. The correction process is either a process of correcting at least one of a gain of the first audio signal obtained or a gain of the second audio signal obtained, or a process of correcting at least one of frequency characteristics based on the first audio signal obtained or frequency characteristics based on the second audio signal obtained.

In this way, it is possible to perform the correction process based on the positional relationship between the second range and the predetermined range, which allows the listener to listen to the second sound which arrives at the listener from behind the listener more easily.

For example, when the second range is divided into a back-right range which is a range located back-right of the listener, a back-left range which is a range located back-left of the listener, and a back-center range which is a range located back-center of the listener, the performing of the correction process is: performing either a process of decreasing a gain of the first audio signal obtained or a process of increasing a gain of the second audio signal obtained, when the predetermined direction is determined to be included in either the back-right range or the back-left range; and performing a process of decreasing a gain of the first audio signal obtained and a process of increasing a gain of the second audio signal obtained, when the predetermined direction is determined to be included in the back-center range.

In this way, the correction process that is performed when the predetermined range is included in the back-center range, the correction process of making the intensity of the second audio signal indicating the second sound to be higher than the intensity of the first audio signal indicating the first sound more significantly compared to the case in which the predetermined direction is included in either the back-right range or the back-left range. Accordingly, it becomes easy for the listener to listen to the second sound which arrives at the listener from behind the listener.

For example, the obtaining of the first audio signal and the second audio signal is obtaining (i) a plurality of first audio signals indicating a plurality of first sounds and the second audio signal and (ii) classification information about groups into which the plurality of first audio signals have been respectively classified. In the performing of the correction process, the correction process is performed based on the direction information obtained and the classification information obtained. The plurality of first sounds are sounds collected respectively from a plurality of first ranges.

In this way, in the correction step, it is possible to perform the correction process for each of the groups to each of which a corresponding one of the first audio signals is classified. For this reason, the processing load required for the correction step can be reduced.

A sound reproduction method according to an aspect of the present disclosure includes: obtaining a plurality of first audio signals and a second audio signal, the plurality of first audio signals indicating a plurality of first sounds which arrive at a listener from a plurality of first ranges which are a plurality of predetermined angle ranges, the second audio signal indicating a second sound which arrives at the listener from a predetermined direction; obtaining direction information which is information about a direction that a head part of the listener faces; performing a correction process when the plurality of first ranges and the predetermined direction are determined to be included in a second range based on the direction information obtained, the second range being a back range relative to a front range in the direction that the head part of the listener faces, the correction process being performed on at least one of (i) the plurality of first audio signals obtained or (ii) the second audio signal obtained so that intensity of the second audio signal becomes higher than intensity of the plurality of first audio signals; and performing mixing of the at least one of (i) the plurality of first audio signals or (ii) the second audio signal which has undergone the correction process, and outputting, to an output channel, the plurality of first audio signals and the second audio signal which have undergone the mixing. The plurality of first sounds are sounds collected respectively from the plurality of first ranges.

In this way, the intensity of the second audio signal indicating the second sound is made higher when the first range and the predetermined direction are included in the second range. For this reason, it becomes easy for the listener to listen to the second sound which arrives at the listener from the back range (that is located behind the listener) relative to the front range in the direction that the head part of the listener faces. In other words, the sound reproduction method for making it possible to increase the listener's level of perceiving the second sound which arrives at the listener from behind the listener is achieved.

In this way, in the correction process, it is possible to perform the correction process for each of the groups to each of which a corresponding one of the first audio signals is classified. For this reason, the processing load required for the correction step can be reduced.

For example, a non-transitory medium according to an aspect of the present disclosure may be a non-transitory medium having a computer program recorded thereon for causing a computer to execute any of the sound reproduction methods.

In this way, the computer is capable of executing the above-described sound reproduction method according to the program.

For example, a sound reproduction device according to an aspect of the present disclosure includes: a signal obtainer which obtains a first audio signal and a second audio signal, the first audio signal indicating a first sound which arrives at a listener from a first range which is a predetermined angle range, the second audio signal indicating a second sound which arrives at the listener from a predetermined direction; an information obtainer which obtains direction information which is information about a direction that a head part of the listener faces; a correction processor which performs a correction process when the first range and the predetermined direction are determined to be included in a second range based on the direction information obtained, the second range being a back range relative to a front range in the direction that the head part of the listener faces, the correction process being performed on at least one of the first audio signal obtained or the second audio signal obtained so that intensity of the second audio signal becomes higher than intensity of the first audio signal; and a mixing processor which performs mixing of the at least one of the first audio signal or the second audio signal which has undergone the correction process, and outputting, to an output channel, the first audio signal and the second audio signal which have undergone the mixing.

In this way, the intensity of the second audio signal indicating the second sound is made higher when the first range and the predetermined direction are included in the second range. For this reason, it becomes easy for the listener to listen to the second sound which arrives at the listener from the back range (that is located behind the listener) relative to the front range in the direction that the head part of the listener faces. In other words, the sound reproduction device capable of increasing the listener's level of perceiving the second sound which arrives at the listener from behind the listener is achieved.

As one example, when the first sound is an ambient sound and the second sound is an object sound, it is possible to prevent the object sound from being mixed in the ambient sound so that the object sound cannot be perceived clearly. In other words, the sound reproduction device capable of increasing the listener's level of perceiving the second sound which arrives at the listener from behind the listener is achieved.

Furthermore, these general and specific aspects may be implemented using a system, a device, a method, an integrated circuit, a computer program, or a non-transitory computer-readable medium such as a CD-ROM, or any combination of systems, devices, methods, integrated circuits, computer programs, or computer-readable media.

Hereinafter, embodiments are specifically described with reference to the drawings.

Each of the embodiments described here indicates one general or specific example of the present disclosure. The numerical values, shapes, materials, constituent elements, the arrangement and connection of the constituent elements, steps, the order of the steps, etc., indicated in the following embodiments are mere examples, and therefore do not limit the scope of the claims.

In addition, in the descriptions below, ordinal numbers such as first, second, and third may be assigned to elements. These ordinal numbers are assigned to the elements for the purpose of identifying the elements, and do not necessarily correspond to meaningful orders. These ordinal numbers may be switched as necessary, one or more ordinal numbers may be newly assigned, or some of the ordinal numbers may be removed.

In addition, each of the drawings is a schematic diagram, and thus is not always illustrated precisely. Accordingly, the scales in the respective diagrams do not always match. Throughout the drawings, substantially the same elements are assigned with the same numerical references, and overlapping descriptions are omitted or simplified.

Embodiment 1

A Configuration

Figure 2:
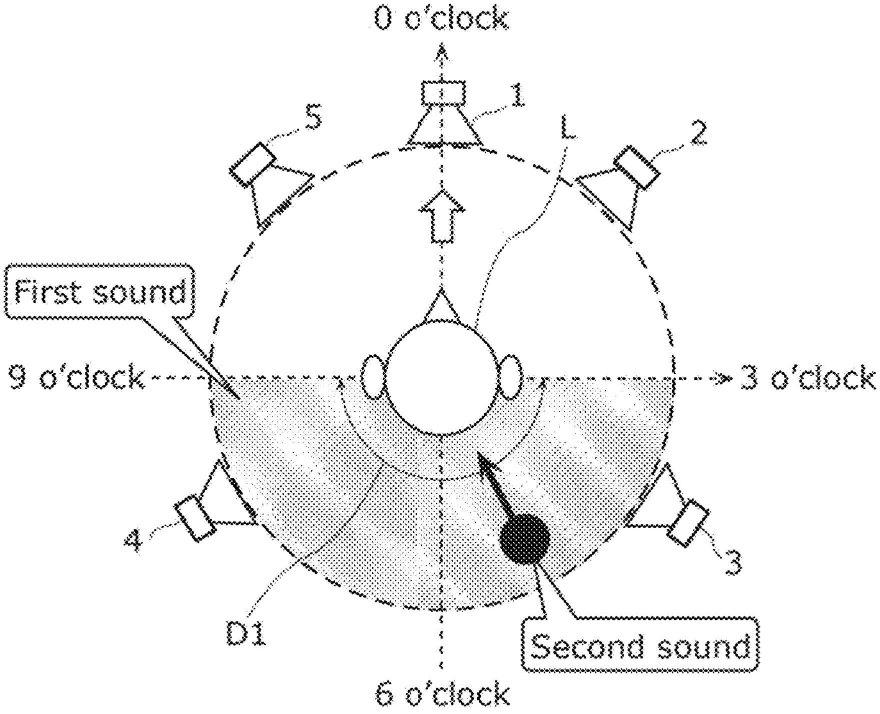
FIG. 2 is a schematic diagram illustrating a usage example of a sound which has been output from speakers according to Embodiment 1.

First, a configuration of sound reproduction device 100 according to Embodiment 1 is described. FIG. 1 is a block diagram illustrating a functional configuration of sound reproduction device 100 according to this embodiment. FIG. 2 is a schematic diagram illustrating a usage case of sounds that have been output from speakers 1, 2, 3, 4, and 5 according to this embodiment.

Sound reproduction device 100 according to this embodiment is a device for processing audio signals obtained and outputting the processed audio signals to speakers 1, 2, 3, 4, and 5 illustrated in each of FIGS. 1 and 2 so as to allow listener L to listen to the sounds indicated by the processed audio signals. More specifically, sound reproduction device 100 is a stereophonic sound reproduction device for allowing listener L to listen to a stereophonic sound.

In addition, sound reproduction device 100 processes the audio signals, based on direction information which has been output by head sensor 300. The direction information is information about the direction that the head part of listener L faces. The direction that the head part of listener L faces is also referred to as the direction that the face of listener L faces.

Head sensor 300 is a device for sensing the direction that the head part of listener L faces. It is excellent that head sensor 300 is a device for sensing information about the six degrees of freedom (six DOF) of the head part of listener L. For example, it is excellent that head sensor 300 is a device which is mounted on the head part of listener L, and is an inertial measurement unit (IMU), an accelerometer, a gyroscope, a magnetic sensor, or a combination of any of these devices.

As illustrated in FIG. 2, it is to be noted that speakers 1, 2, 3, 4, and 5 (five speakers here) are arranged to surround listener L in this embodiment. In FIG. 2, 0 o'clock, 3 o'clock, 6 o'clock, and 9 o'clock are indicated correspondingly to points of time on the face of a clock in order to explain directions. In addition, an open allow indicates the direction that the head part of listener L faces. The direction that the head part of listener L who is positioned at the center (also referred to as the origin) of the face of the clock faces is the direction corresponding to 0 o'clock. Hereinafter, the direction in which listener L and 0 o'clock are aligned on the face of the clock may be referred to as the "0 o'clock direction". This also applies to the other points of time on the face of the clock.

In this embodiment, five speakers 1, 2, 3, 4, and 5 are a center speaker, a front right speaker, a rear right speaker, a rear left speaker, and a front left speaker. It is to be noted that speaker 1 that is the center speaker is arranged in the 0 o'clock direction.

Each of five speakers 1, 2, 3, 4, and 5 is an amplifying device which outputs a corresponding one of the sounds indicated by audio signals which have been output from sound reproduction device 100.

As illustrated in FIG. 1, sound reproduction device 100 includes first signal processor 110, first decoder 121, second decoder 122, first correction processor 131, second correction processor 132, information obtainer 140, and mixing processor 150.

First signal processor 110 is a processor which obtains audio signals. First signal processor 110 may receive audio signals which have been transmitted by another element which is not illustrated in FIG. 2 so as to obtain the audio signals. Alternatively, first signal processor 110 may obtain audio signals that are stored in storage which is not illustrated in FIG. 2. The audio signals obtained by first signal processor 110 are signals including a first audio signal and a second audio signal.

Here, the first audio signal and the second audio signal are described.

The first audio signal is a signal indicating a first sound which is a sound that arrives at listener L from first range D1 which is a predetermined angle range. For example, first range D1 is a back range including a back point relative to a reference point in a reference direction which is defined by the positions of five speakers 1, 2, 3, 4, and 5 that are output channels. In this embodiment, the reference direction is the direction from listener L to speaker 1 which is the center speaker. The reference direction is the 0 o'clock direction for example, but is not limited thereto. The direction included in the back range relative to the 0 o'clock direction which is the reference direction is the 6 o'clock direction. It is only necessary that the 6 o'clock direction which is the back direction relative to the reference direction be included in first range D1. Although first range D1 is a range from the 3 o'clock direction to the 9 o'clock direction (that is, a 180° range in terms of angle). It is to be noted that the reference direction is constant irrespective of the direction that the head part of listener L faces, and thus that first range D1 is also constant irrespective of the direction that the head part of listener L faces.

The first sound is a sound which arrives at listener L from an entirety or a part of first range D1 which extends as such, and which is what is called an ambient sound or a noise. In addition, the first sound may be referred to as an ambient sound. In this embodiment, the first sound is an ambient sound which arrives at listener L from the entirety of first range D1. Here, the first sound is a sound which arrives at listener L from the entirety of a region dotted in FIG. 2.

The second audio signal is a signal indicating a second sound which is a sound that arrives at listener L from a predetermined direction.

The second sound is, for example, a sound whose sound image is localized at a black circle illustrated in FIG. 2. In addition, the second sound may be a sound which arrives at listener L from a range that is narrower than the range for the first sound. The second sound is, for example, what is called an object sound which is a sound that listener L mainly listens to. The object sound is also referred to as a sound other than ambient sounds.

As illustrated in FIG. 2, in this embodiment, the predetermined direction is the 5 o'clock direction, and the arrow indicates that the second sound which arrives at listener L from the predetermined direction. The predetermined direction is constant irrespective of the direction that the head part of listener L faces.

First signal processor 110 is described again.

First signal processor 110 performs a process of separating audio signals into a first audio signal and a second audio signal. First signal processor 110 outputs the separated first audio signal to first decoder 121, and outputs the separated second audio signal to second decoder 122. In this embodiment, first signal processor 110 is a demultiplexer for example, but is not limited thereto.

It is excellent that, in this embodiment, the audio signals obtained by first signal processor 110 have undergone an encoding process defined in MPEG-H 3D Audio (ISO/IEC 23008-3) (hereinafter, referred to as MPEG-H 3D Audio), or the like. In other words, first signal processor 110 obtains the audio signals that are encoded bitstreams.

First decoder 121 and second decoder 122 which are examples of signal obtainers obtain audio signals. Specifically, first decoder 121 obtains the first audio signal separated by first signal processor 110, and decodes the first audio signal. Second decoder 122 obtains the second audio signal separated by first signal processor 110, and decodes the second audio signal. First decoder 121 and second decoder 122 each perform a decoding process based on MPEG-H 3D Audio, or the like described above.

First decoder 121 outputs a decoded first audio signal to first correction processor 131, and second decoder 122 outputs a decoded second audio signal to second correction processor 132.

First decoder 121 outputs, to information obtainer 140, first information which is information indicating first range D1 included in the first audio signal. Second decoder 122 outputs, to information obtainer 140, second information which is information indicating the predetermined direction in which the second sound included in the second audio signal arrives at listener L.

Information obtainer 140 is a processor which obtains the direction information output from head sensor 300. Information obtainer 140 further obtains first information which has been output by first decoder 121 and second information which has been output by second decoder 122. Information obtainer 140 outputs the obtained direction information, first information, and second information to first correction processor 131 and second correction processor 132.

First correction processor 131 and second correction processor 132 are hereinafter also referred to as a correction processor. The correction processor is a processor which performs a correction process on at least one of the first audio signal or the second audio signal.

First correction processor 131 obtains the first audio signal obtained by first decoder 121, the direction information obtained by information obtainer 140, and the first information and the second information. Second correction processor 132 obtains the second audio signal obtained by second decoder 122, the direction information obtained by information obtainer 140, and the first information and the second information.

The correction processor (first correction processor 131 and second correction processor 132) performs the correction processes on at least one of the first audio signal or the second audio signal based on the obtained direction information, under predetermined conditions (to be described later with reference to FIGS. 3 to 6).

More specifically, first correction processor 131 performs a correction process on the first audio signal, and second correction processor 132 performs a correction process on the second audio signal.

Here, when the correction process has been performed on the first audio signal and the second audio signal: first correction processor 131 outputs, to mixing processor 150, the first audio signal on which the correction process has been performed; and second correction processor 132 outputs, to mixing processor 150, the second audio signal on which the correction process has been performed.

When the correction process on the first audio signal only has been performed: first correction processor 131 outputs, to mixing processor 150, the first audio signal on which the correction process has been performed; and second correction processor 132 outputs, to mixing processor 150, the second audio signal on which no correction process has been performed.

When the correction process on the second audio signal only has been performed: first correction processor 131 outputs, to mixing processor 150, the first audio signal on which no correction process has been performed; and second correction processor 132 outputs, to mixing processor 150, the second audio signal on which the correction process has been performed.

Mixing processor 150 is a processor which performs mixing of at least one of the first audio signal or the second audio signal on which the correction process has been performed by the correction processor, and outputs the first audio signal and the second audio signal to speakers 1, 2, 3, 4, and 5 which are output channels.

More specifically, when the correction process has been performed on the first audio signal and the second audio signal, mixing processor 150 performs mixing of the first audio signal and the second audio signal on which the correction process has been performed, and outputs the first audio signal and the second audio signal which have undergone the mixing. When the correction process on the first audio signal only has been performed, mixing processor 150 performs mixing of the first audio signal on which the correction process has been performed and the second audio signal on which no correction process has been performed, and outputs the first audio signal which has undergone the mixing and the second audio signal. When the correction process on the second audio signal only has been performed, mixing processor 150 performs mixing of the first audio signal on which no correction process has been performed and the second audio signal on which the correction process has been performed, and outputs the first audio signal and the second audio signal which has undergone the mixing.

As another example case in which a headphone disposed near the auricula of listener L is used instead of speakers 1, 2, 3, 4, and 5 arranged around the listener L, it is to be noted that mixing processor 150 performs the process indicated below. In this case, mixing processor 150 performs a process of convoluting a head-related transfer function into the first audio signal and the second audio signal when performing mixing of the first audio signal and the second audio signal.

An Operation Example

Figure 3:
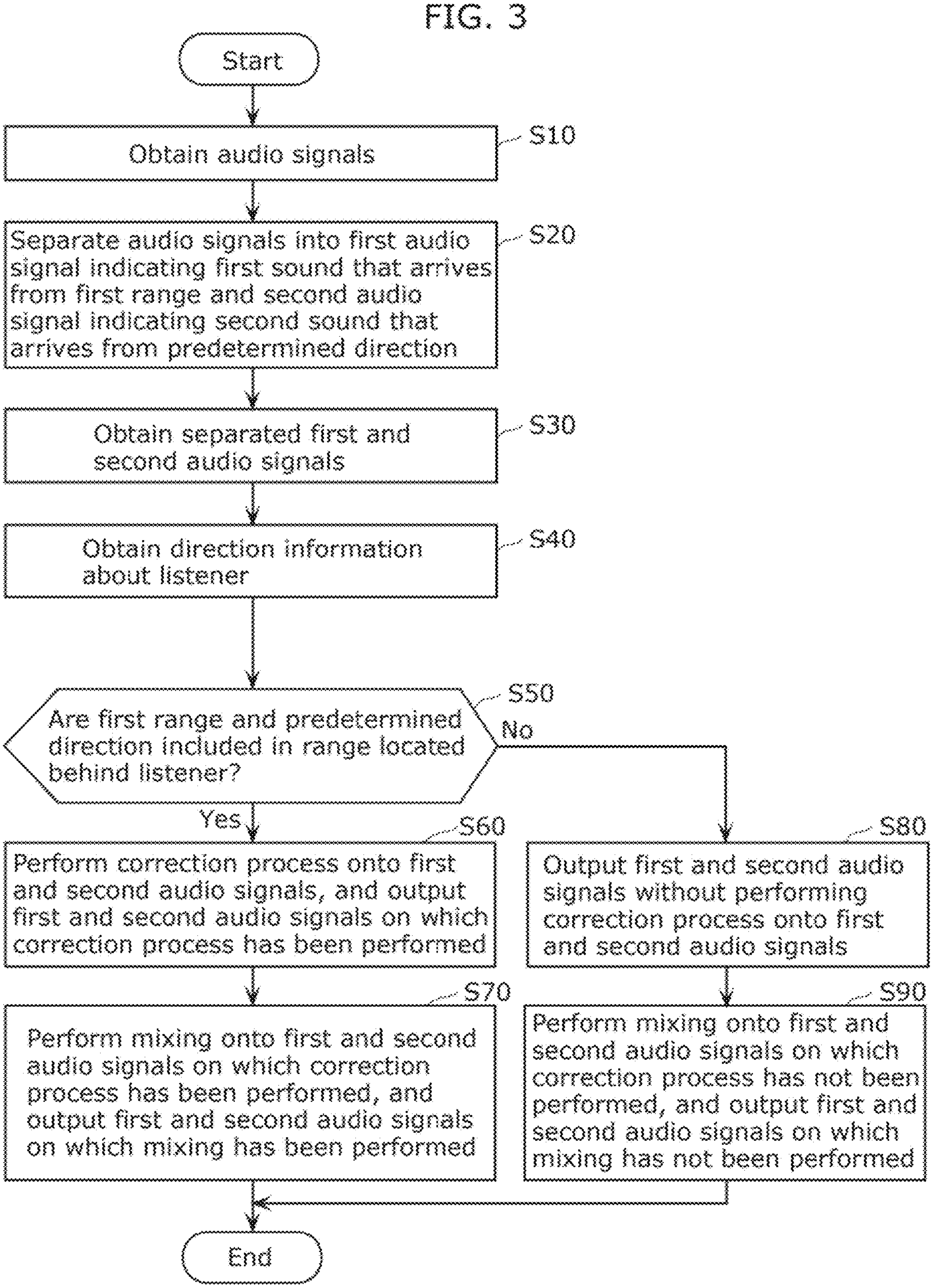
FIG. 3 is a flow chart indicating an example of an operation that is performed by the sound reproduction device according to Embodiment 1.

Hereinafter, a description is given of an operation example of a sound reproduction method that is performed by sound reproduction device 100. FIG. 3 is a flow chart of the operation example that is performed by sound reproduction device 100 according to this embodiment.

First signal processor 110 obtains audio signals (S10).

First signal processor 110 separates audio signals obtained by first signal processor 110 into a first audio signal and a second audio signal (S20).

First decoder 121 and second decoder 122 obtain the separated first audio signal and second audio signal, respectively (S30). Step S30 is a signal obtaining step. More specifically, it is to be noted that first decoder 121 obtains the first audio signal, and second decoder 122 obtains the second audio signal. Furthermore, first decoder 121 decodes the first audio signal, and second decoder 122 decodes the second audio signal.

Here, information obtainer 140 obtains direction information which has been output by head sensor 300 (S40). Step S40 is a signal obtaining step. In addition, information obtainer 140 obtains first information indicating first range D1 included in the first audio signal indicating the first sound and second information indicating the predetermined direction which is the direction to which the second sound arrives at listener L.

Furthermore, information obtainer 140 outputs the obtained direction information, and first information and second information to first correction processor 131 and second correction processor 132 (that are the correction processor).

The correction processor obtains the first audio signal, the second audio signal, the direction information, and the first information and the second information. The correction processor further determines whether first range D1 and the predetermined direction are included in second range D2, based on the direction information (S50). More specifically, the correction processor makes the above determination, based on the obtained direction information and the first information and the second information.

Here, the determinations each of which is performed by the correction processor and second range D2 are described with reference to FIGS. 4 to 6.

Figure 4:
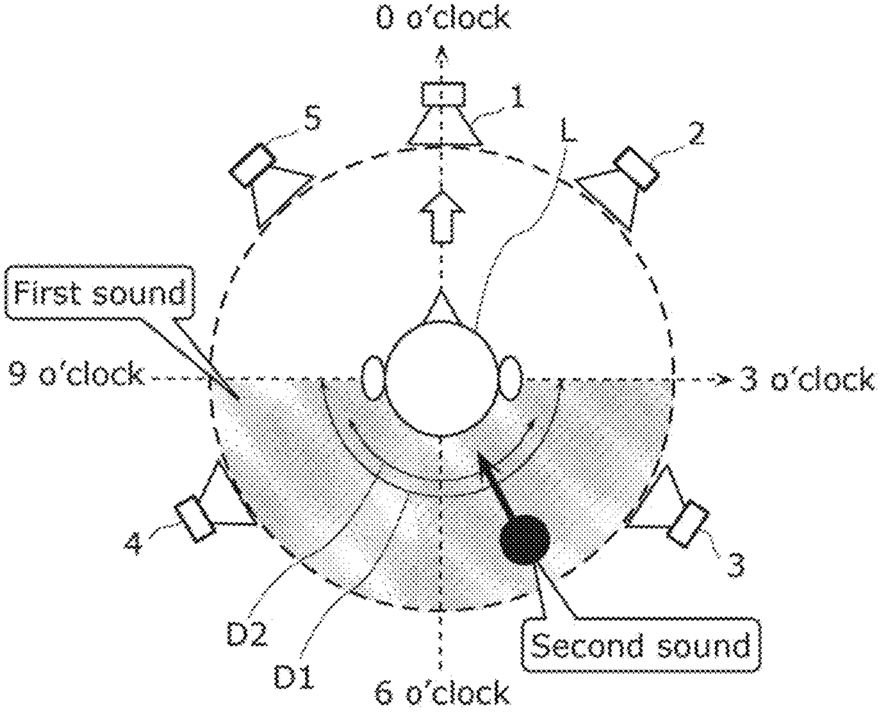
FIG. 4 is a schematic diagram for explaining one example of a determination which is performed by a correction processor according to Embodiment 1.
Figure 5:
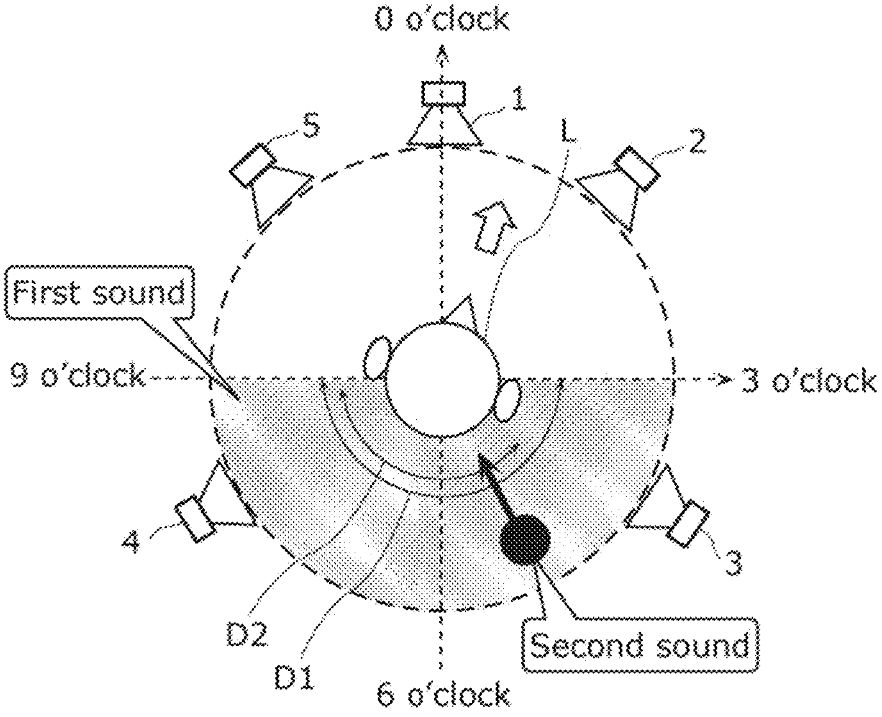
FIG. 5 is a schematic diagram for explaining one example of a determination which is performed by the correction processor according to Embodiment 1.
Figure 6:
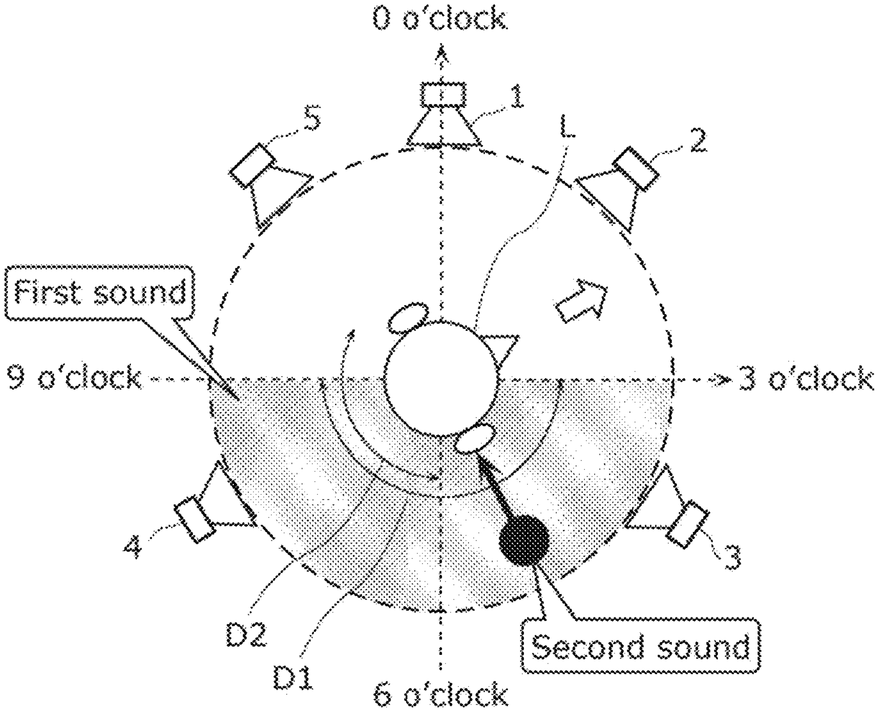
FIG. 6 is a schematic diagram for explaining another one example of a determination which is performed by the correction processor according to Embodiment 1.

FIGS. 4 to 6 are each a schematic diagram for explaining one example of a determination that is made by the correction processor according to this embodiment. More specifically, in each of FIGS. 4 and 5, the correction processor determines that first range D1 and the predetermined direction are included in second range D2, and determines that first range D1 and the predetermined direction are not included in second range D2 in FIG. 6. In addition, FIGS. 4, 5, and 6 illustrate how the direction that the head part of listener L faces changes clockwise in the order from FIG. 4 to FIG. 6.

As illustrated in FIGS. 4 to 6, second range D2 is a back range when the direction that the head part of listener L faces is a front range. In other words, second range D2 is a back range relative to listener L. In addition, second range D2 is a range having, as its center, the direction opposite to the direction that the head part of listener L faces. As illustrated in FIG. 4 as one example case where the direction that the head part of listener L faces is the 0 o'clock direction, second range D2 is a range from the 4 o'clock direction to the 8 o'clock direction having, as its center, the 6 o'clock direction opposite to the 0 o'clock direction (that is, second range D2 is a 120° range in terms of angle). However, second range D2 is not limited thereto. In addition, second range D2 is defined based on the direction information obtained by information obtainer 140. When the direction that the head part of listener L faces changes, second range D2 changes in response to the change as illustrated in FIGS. 4 to 6. However, it is to be noted that first range D1 and the predetermined direction do not change as described above.

In other words, the correction processor determines whether first range D1 and the predetermined direction are included in second range D2 which is the back range relative to listener L determined based on the direction information. Specifically, the positional relationship between first range D1, the predetermined direction, and second range D2 is described below.

First, as illustrated in each of FIGS. 4 and 5, a description is given of cases in each of which the correction processor determines that both first range D1 and the predetermined direction are included in second range D2 (Yes in Step S50).

When the direction that the head part of listener L faces is the 0 o'clock direction as illustrated in FIG. 4, second range D2 is the range from the 4 o'clock direction to the 8 o'clock direction. In addition, first range D1 relating to the first sound which is an ambient sound is the range from the 3 o'clock direction to the 9 o'clock direction, and the predetermined direction relating to the second sound which is an object sound is the 5 o'clock direction. In other words, the predetermined direction is included in first range D1, and a part of first range D1 is included in second range D2. At this time, the correction processor determines that both first range D1 and the predetermined direction are included in second range D2. Furthermore, the first sound and the second sound are sounds which arrive at listener L from second range D2 (which is the back range located behind listener L).

Furthermore, this also applies to the case in which the direction that the head part of listener L faces as illustrated in FIG. 5 changes clockwise more than in the case illustrated in FIG. 4.

In each of the cases illustrated in FIGS. 4 and 5, the correction processor performs a correction process on at least one of the first audio signal or the second audio signal. Here, as one example, the correction processor performs the correction process on both the first audio signal and the second audio signal (S60). More specifically, first correction processor 131 performs the correction process on the first audio signal, and second correction processor 132 performs the correction process on the second audio signal. Step S60 is a correcting step.

The correction process which is performed by the correction processor is a process for making the intensity of the second audio signal higher than the intensity of the first audio signal. "Making the intensity of an audio signal higher" means, for example, increasing the sound volume or sound pressure of the sound indicated by the audio signal. It is to be noted that details of the correction processes are described in Examples 1 to 3 described below.

First correction processor 131 outputs, to mixing processor 150, first audio signal on which the correction process has been performed; and second correction processor 132 outputs, to mixing processor 150, the second audio signal on which the correction process has been performed.

Mixing processor 150 performs mixing of the first audio signal and the second audio signal on which the correction process has been performed by the correction processor, and outputs the first audio signal and the second audio signal to speakers 1, 2, 3, 4, and 5 which are output channels (S70). Step S70 is a mixing step.

Next, a description is given of a case (No in Step S50) in which the correction processor determines that first range D1 and the predetermined direction are not included in second range D2 as illustrated in FIG. 6.

When the direction that the head part of listener L faces is the 2 o'clock direction as illustrated in FIG. 6, second range D2 is the range from the 6 o'clock direction to the 10 o'clock direction. First range D1 and the predetermined direction do not change from the ones in FIG. 4 to the ones in FIG. 5. At this time, the correction processor determines that the predetermined direction is not included in second range D2. More specifically, the correction processor determines that at least one of first range D1 or the predetermined range is not included in second range D2.

In the case illustrated in FIG. 6, the correction processor does not perform any correction process on the first audio signal and the second audio signal (S80). First correction processor 131 outputs, to mixing processor 150, first audio signal on which no correction process has been performed; and second correction processor 132 outputs, to mixing processor 150, the second audio signal on which no correction process has been performed.

Mixing processor 150 performs mixing of the first audio signal and the second audio signal on which no correction process has been performed by the correction processor, and outputs the first audio signal and the second audio signal to speakers 1, 2, 3, 4, and 5 which are output channels (S90).

In this way, in this embodiment, when the correction processor determines that first range D1 and the predetermined direction are included in second range D2, the correction processor performs the correction process on at least one of the first audio signal or the second audio signal. The correction process is a process for making the intensity of the second audio signal higher than the intensity of the first audio signal.

In this way, the intensity of the second audio signal indicating the second sound is made higher when first range D1 and the predetermined direction are included in second range D2. For this reason, it becomes easy for listener L to listen to the second sound which arrives at listener L from the back range (that is, a range located behind listener L) when the direction that the head part of listener L faces is the front range. In other words, sound reproduction device 100 and the sound reproduction method for making it possible to increase the listener L's level of perceiving the second sound which arrives at listener L from behind listener L.

As one example, when the first sound is an ambient sound and the second sound is an object sound, it is possible to prevent the object sound from being mixed in the ambient sound so that the object sound cannot be perceived clearly. In other words, sound reproduction device 100 capable of increasing the listener L's level of perceiving the object sound which arrives at listener L from behind listener L.

For example, first range D1 is a back range relative to a reference direction which is defined by the positions of five speakers 1, 2, 3, 4, and 5.

In this way, even in the case where the first sound arrives at listener L from the back range relative to the reference direction, it becomes easy for listener L to listen to the second sound which arrives at listener L from behind listener L.

Here, a description is given of Examples 1 to 3 of correction processes each of which is performed by the correction processor.

Example 1

In Example 1, a correction process is a process of correcting at least one of the gain of a first audio signal obtained by first decoder 121 or the gain of a second audio signal obtained by second decoder 122. More specifically, the correction process is at least one of a process of decreasing the gain of the first audio signal obtained or a process of increasing the gain of the second audio signal obtained.

Figure 7:
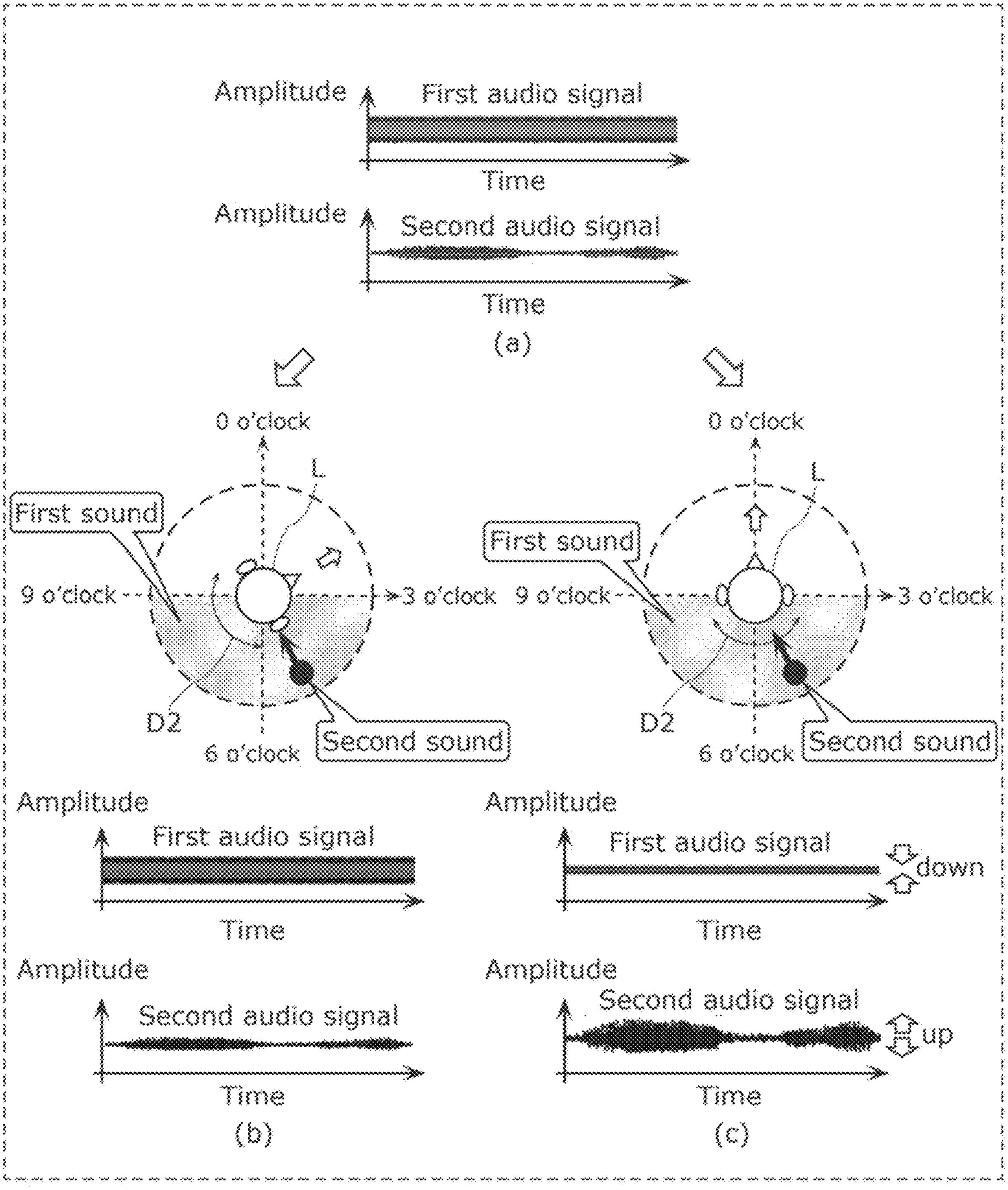
FIG. 7 is a schematic diagram for explaining examples of correction processes each of which is performed by the correction processor according to Embodiment 1.

FIG. 7 is a diagram for explaining examples of correction processes each of which is performed by the correction processor according to this embodiment. More specifically, (a) in FIG. 7 is a diagram illustrating the relationship in time and amplitude between a first audio signal and a second audio signal on which a correction process has not been performed. It is to be noted that, in FIG. 7, first range D1 and speakers 1, 2, 3, 4, and 5 are not illustrated. This also applies to FIGS. 8 and 9 to be described later.

In FIG. 7, (b) illustrates an example in which no correction process is performed on a first audio signal and a second audio signal. The positional relationship between (i) first range D1 and (ii) a predetermined direction and second range D2 illustrated in (b) of FIG. 7 corresponds to the case illustrated in FIG. 6. More specifically, (b) of FIG. 7 illustrates the case of No in Step S50 indicated in FIG. 3. In this case, the correction processor does not perform any correction process on the first audio signal and the second audio signal.

In FIG. 7, (c) illustrates an example in which a correction process has been performed on the first audio signal and the second audio signal. The positional relationship between (i) first range D1 and (ii) a predetermined direction and second range D2 illustrated in (c) of FIG. 7 corresponds to the case illustrated in FIG. 4. More specifically, (c) of FIG. 7 illustrates the case of Yes in Step S50 indicated in FIG. 3.

In this case, the correction processor performs at least one correction process that is a process of decreasing the gain of the first audio signal or a process of increasing the gain of the second audio signal. Here, the correction processor performs both the process of decreasing the gain of the first audio signal and the process of increasing the gain of the second audio signal. In this way, the gain of the first audio signal and the gain of the second audio signal are corrected, resulting in correction of the amplitude of the first audio signal and the amplitude of the second audio signal as illustrated in FIG. 7. In other words, the correction processor performs both the process of decreasing the amplitude of the first audio signal indicating the first sound and the process of increasing the amplitude of the second audio signal indicating the second sound. This allows listener L to listen to the second sound more easily.

In Example 1, the correction process is the process of correcting at least one of the gain of the first audio signal or the gain of the second audio signal. In this way, at least one of the amplitude of the first audio signal indicating the first sound or the amplitude of the second audio signal indicating the second sound is corrected, which allows listener L to listen to the second sound more easily.

More specifically, the correction process is at least one of a process of decreasing the gain of the first audio signal obtained and a process of increasing the gain of the second audio signal obtained. This allows listener L to listen to the second sound more easily.

Example 2

In Example 2, a correction process is a process of correcting at least one of frequency components based on a first audio signal obtained by first decoder 121 or frequency components based on a second audio signal obtained by second decoder 122. More specifically, the correction process is a process of decreasing the spectrum of the frequency components based on the first audio signal so that the spectrum of the frequency components based on the first audio signal become smaller than the spectrum of the frequency components based on the second audio signal. Here, as one example, the correction process is a process of subtracting the spectrum of the frequency components based on the second audio signal from the spectrum of the frequency components based on the first audio signal.

Figure 8:
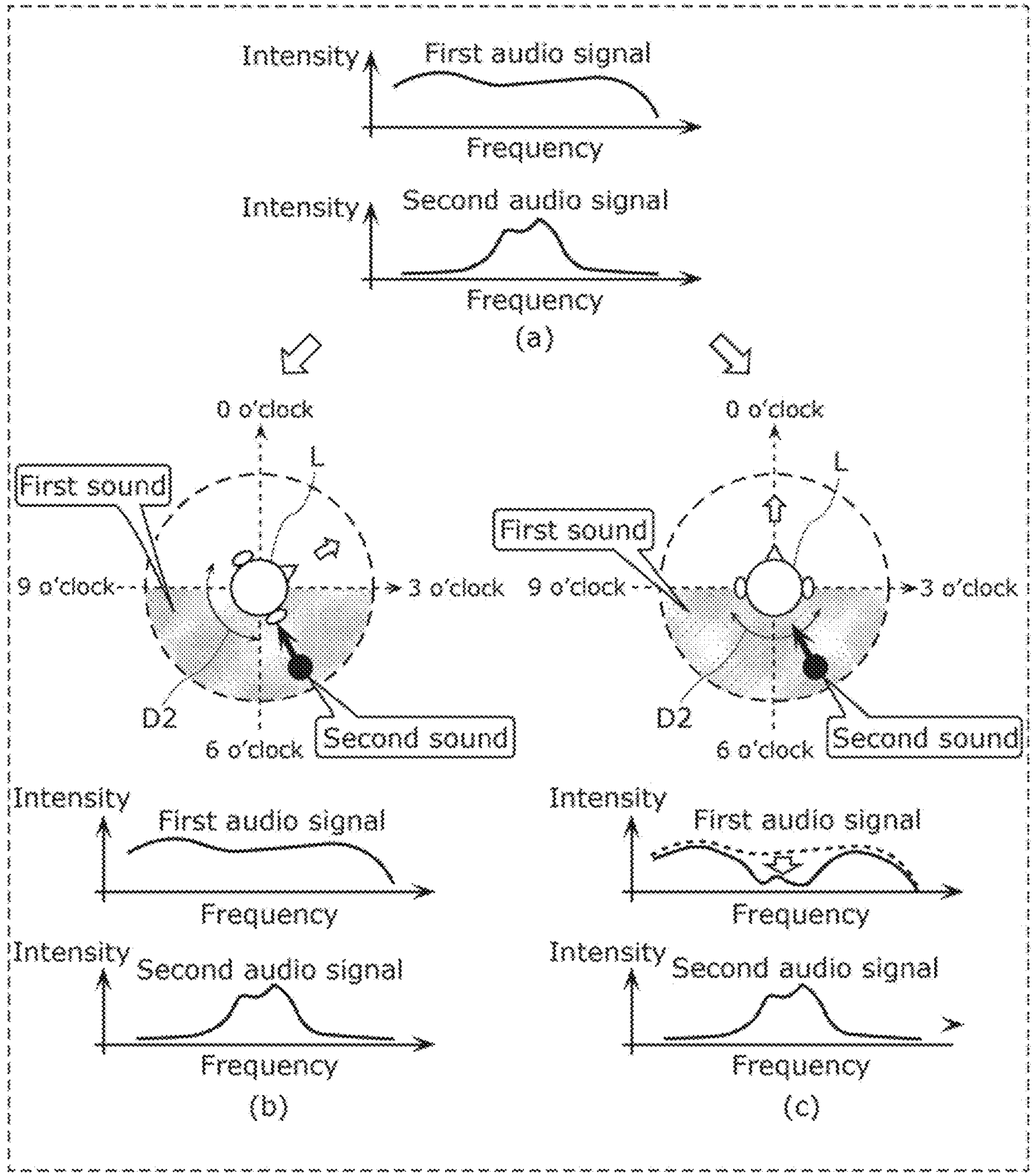
FIG. 8 is a schematic diagram for explaining other examples of correction processes each of which is performed by the correction processor according to Embodiment 1.

FIG. 8 is a diagram for explaining other examples of correction processes each of which is performed by the correction processor according to this embodiment. More specifically, (a) of FIG. 8 is a diagram illustrating the spectrum of frequency components based on a first audio signal on which no correction process has been performed and the spectrum of frequency components based on a second audio signal on which no correction process has been performed. The spectra of the frequency components are obtained by, for example, performing a Fourier transform process on the first audio signal and the second audio signal.

In FIG. 8, (b) illustrates an example in which no correction process is performed on a first audio signal and a second audio signal. The positional relationship between (i) first range D1 and (ii) a predetermined direction and second range D2 illustrated in (b) of FIG. 8 corresponds to the case illustrated in FIG. 6. More specifically, (b) of FIG. 8 illustrates the case of No in Step S50 indicated in FIG. 3. In this case, the correction processor does not perform any correction process on the first audio signal and the second audio signal.

In FIG. 8, (c) illustrates an example in which a correction process has been performed on the first audio signal. The positional relationship between (i) first range D1 and (ii) a predetermined direction and second range D2 illustrated in (c) of FIG. 8 corresponds to the case illustrated in FIG. 4. More specifically, (c) of FIG. 8 illustrates the case of Yes in Step S50 indicated in FIG. 3.

In this case, the correction processor (more specifically, first correction processor 131 here) performs a process of subtracting the spectrum of the frequency components based on the second audio signal from the spectrum of the frequency components based on the first audio signal. As illustrated in (c) of FIG. 8, this results in a decrease in the intensity in the spectrum of the frequency components based on the first audio signal indicating the first sound. On the other hand, no correction process is performed on the second audio signal, the intensity in the spectrum of the frequency components based on the second audio signal indicating the second sound is constant. In other words, the intensity of the partial spectrum of the frequency components based on the first audio signal decreases, and the intensity of the second audio signal is constant. This allows listener L to listen to the second sound more easily.

In Example 2, the correction process is the process of correcting at least one of the frequency components based on the first audio signal indicating the first sound or the frequency components based on the second audio signal indicating the second sound. This allows listener L to listen to the second sound more easily.

More specifically, the correction process is a process of decreasing the spectrum of the frequency components based on the first audio signal so that the spectrum of the frequency components based on the first audio signal become smaller than the spectrum of the frequency components based on the second audio signal. Here, the correction process is a process of subtracting the spectrum of the frequency components based on the second audio signal from the spectrum of the frequency components based on the first audio signal. In this way, the intensity of the partial spectrum of the frequency components based on the first audio signal indicating the first sound decreases, which allows listener L to listen to the second sound more easily.

More specifically, the correction process may be a process of decreasing the spectrum of the frequency components based on the first audio signal so that the spectrum of the frequency components based on the first audio signal becomes smaller, by a predetermined rate, than the spectrum of the frequency components based on the second audio signal. For example, the correction process may be performed so that the peak intensity of the spectrum of the frequency components based on the second audio signal decreases by the predetermined rate or more relative to the peak intensity of the spectrum of the frequency components based on the first audio signal.

Example 3

In Example 3, the correction processor performs a correction process based on the positional relationship between second range D2 and a predetermined direction. At this time, the correction process is either a process of correcting at least one of the gain of a first audio signal or the gain of a second audio signal, or a process of correcting frequency characteristics based on the first audio signal or frequency characteristics based on the second audio signal. Here, the correction process is a process of correcting at least one of the gain of the first audio signal or the gain of the second audio signal.

Figure 9:
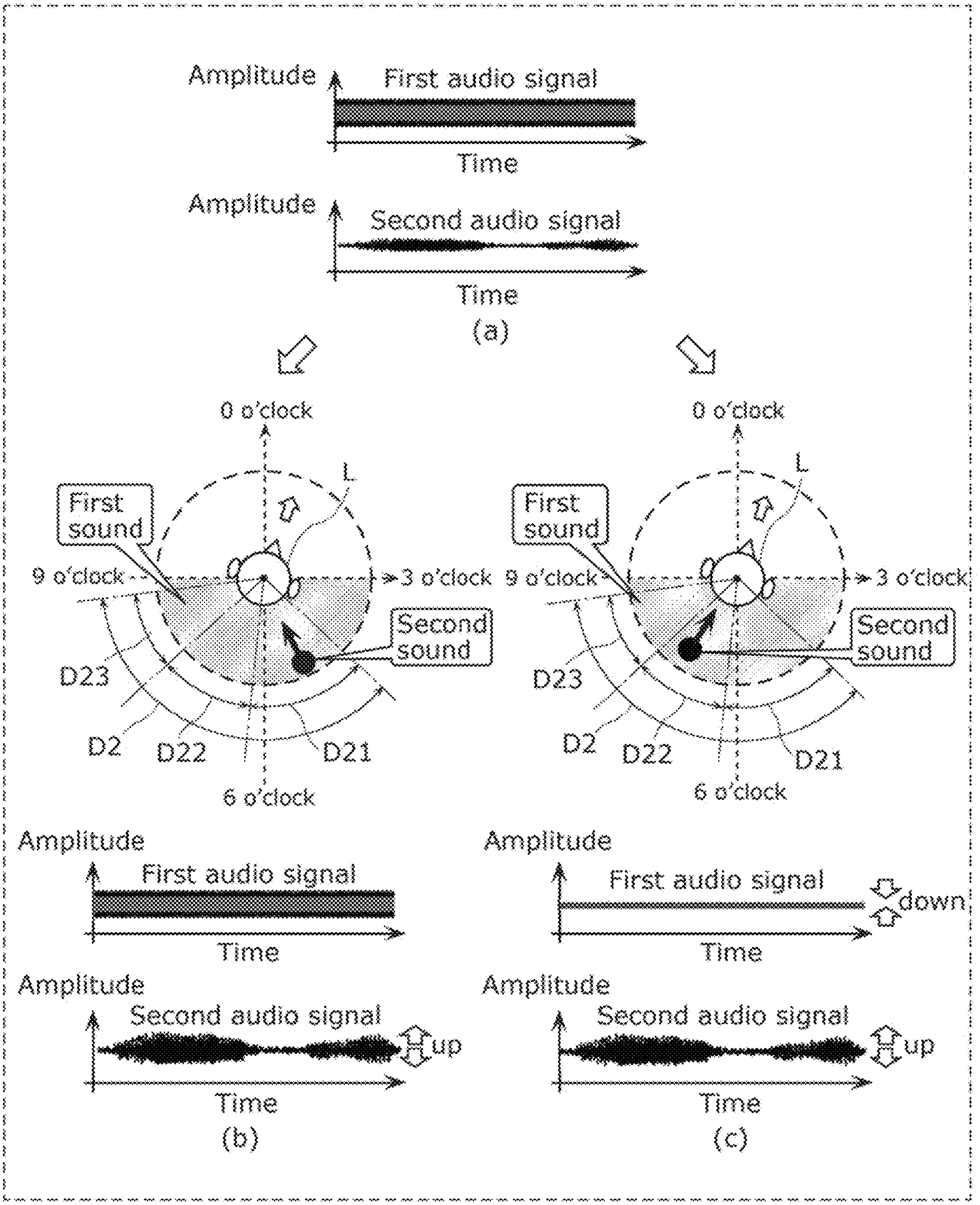
FIG. 9 is a schematic diagram for explaining other examples of correction processes each of which is performed by the correction processor according to Embodiment 1.

FIG. 9 is a diagram for explaining other examples of correction processes each of which is performed by the correction processor according to this embodiment. More specifically, (a) in FIG. 9 is a diagram illustrating the relationship in time and amplitude between the first audio signal and the second audio signal on which no correction process has been performed. In addition, each of (b) and (c) of FIG. 9 illustrates an example in which at least one of the gain of the first audio signal or the gain of the second audio signal has been corrected. It is to be noted that (c) of FIG. 9 illustrates an example in which a second sound is a sound that arrives at listener L from the 7 o'clock direction.

In addition, in Example 3, second range D2 is divided as indicated below. As illustrated in (b) and (c) of FIG. 9, second range D2 is divided into back-right range D21 which is a range located back-right of listener L, back-left range D23 which is a range located back-left of listener L, and back-center range D22 which is a range located between back-right range D21 and back-left range D23. It is excellent that back-center range D22 includes the direction right behind listener L.

In FIG. 9, (b) illustrates an example in which the correction processor has determined that a predetermined direction (here, the 5 o'clock direction) is included in back-right range D21. At this time, the correction processor performs the correction process which is either the process of decreasing the gain of the first audio signal or the process of increasing the gain of the second audio signal. The correction processor (more specifically, second correction processor 132 here) performs the correction process which is the process of increasing the gain of the second audio signal.

This allows listener L to listen to the second sound more easily.

It is to be noted that a similar correction process is performed even in an example in which the correction processor has determined that a predetermined direction is included in back-left range D23 although the case is not illustrated.

In FIG. 9, (c) illustrates an example in which the correction processor has determined that a predetermined direction (here, the 7 o'clock direction) is included in back-center range D22. At this time, the correction processor performs the correction process which is the process of decreasing the gain of the first audio signal and the process of increasing the gain of the second audio signal. Here, first correction processor 131 performs the correction process which is the process of decreasing the gain of the first audio signal, and second correction processor 132 performs the correction process which is the process of increasing the gain of the second audio signal. As a result, the correction process is performed so that the amplitude of the first audio signal decreases and the amplitude of the second audio signal increases.

This allows listener L to listen to the second sound more easily than in the example illustrated in (b) of FIG. 9.

As described above, a human has a lower level of perception of a sound which arrives from behind the listener. Furthermore, a human has a lower perception level as a sound arrival direction is closer to the direction right behind the human.

For this reason, the correction processes as illustrated in Example 3 are performed. In other words, the correction processes are performed based on the positional relationship between second range D2 and the predetermined direction. More specifically, when the predetermined direction is included in back-right range D22 including the direction right behind listener L, the following correction processes are performed. The correction process performed at this time is the process of making the intensity of the second audio signal indicating the second sound higher than the intensity of the first audio signal indicating the first sound, compared to the case in which the predetermined direction is included in back-right range D21, or the like. This allows listener L to listen to the second sound more easily.

[Details of the Correction Processes]

Furthermore, details about how the correction processor performs the correction processes on the first audio signal are described with reference FIGS. 10 and 11.

Figure 10:
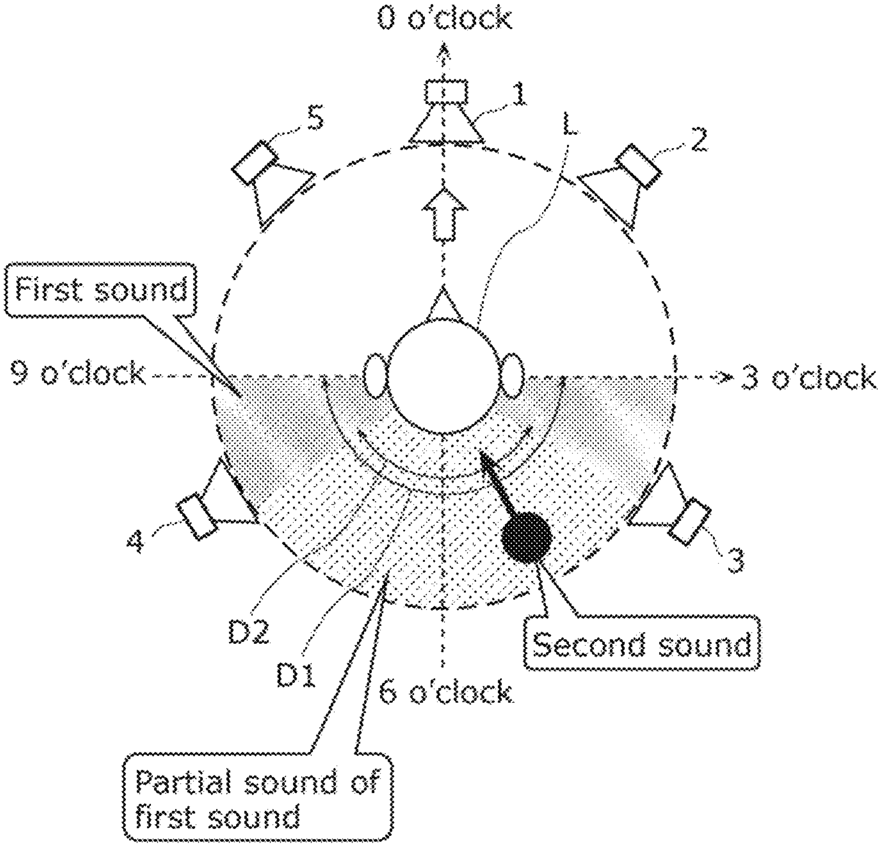
FIG. 10 is a schematic diagram illustrating one example of a correction process that is performed on a first audio signal according to Embodiment 1.

FIG. 10 is a schematic diagram indicating one example of a correction process performed on a first audio signal according to this embodiment. FIG. 11 is a schematic diagram indicating another example of a correction process performed on a first audio signal according to this embodiment. It is to be noted that the direction that the head part of listener L faces in each of FIGS. 10 and 11 is the 0 o'clock direction as in FIG. 2, etc.

In each of Example 1 to Example 3 described above, the correction processor may perform a correction process on the first audio signal indicating a partial sound of the first sound as indicated below.

For example, as illustrated in FIG. 10, the correction processor performs a correction process on the first audio signal indicating a partial sound, which is included in the first sound, which arrives at listener L from the entire range of second range D2. The partial sound, which is included in the first sound, which arrives at listener L from the entire range of second range D2 is a sound which arrives at listener L from the entirety of the region with sparse dots in FIG. 10. It is to be noted that the remaining part of the first sound is a sound which arrives at listener L from the region with dense dots in FIG. 10.

In this case, for example, the correction processor performs a correction process of decreasing the gain of the first audio signal indicating the partial sound, which is included in the first sound, which arrives at listener L from the entire range of second range D2.

Figure 11:
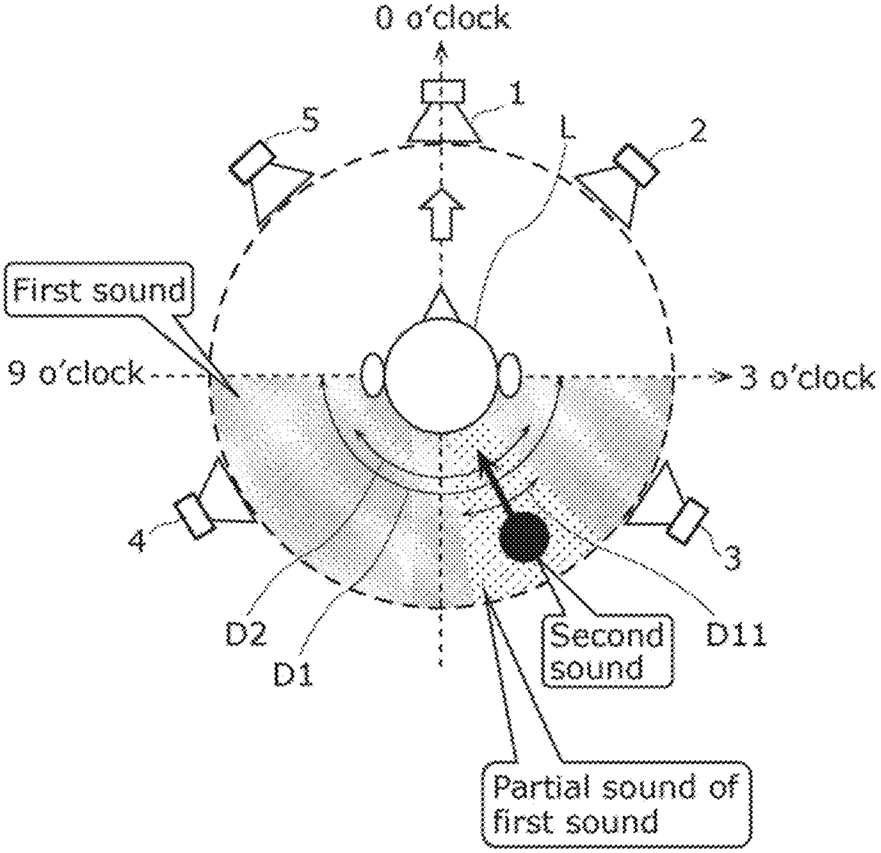
FIG. 11 is a schematic diagram illustrating another one example of a correction process that is performed on a first audio signal according to Embodiment 1.

For example, as illustrated in FIG. 11, the correction processor performs a correction process on the first audio signal indicating the sound, which is included in the first sound, which arrives at listener L from a region located around the predetermined direction in which the second sound arrives at listener L. The region around the predetermined direction is range D11 having the predetermined direction as its center with an approximately 30° angle as one example as illustrated in FIG. 11, but the region is a non-limiting example.

The partial sound, which is included in the first sound, which arrives at listener L from the region around the predetermined direction is a sound which arrives at listener L from the entirety of the region with sparse dots in FIG. 11. It is to be noted that the remaining part of the first sound is a sound which arrives at listener L from the region with dense dots in FIG. 11.

In this case, for example, the correction processor performs a correction process of decreasing the gain of the first audio signal indicating the partial sound, which is included in the first sound, which arrives at listener L from the region around the predetermined direction in which the second sound arrives at listener L.

In this way, the correction processor may perform the correction process on the first audio signal indicating the partial sound of the first sound. This eliminates the need to perform a correction process on the whole first audio signal, and enables reduction in processing load of first correction processor 131 which corrects the first audio signal.

It is to be noted that a similar process may be performed on the first audio signal indicating the whole first sound.

Embodiment 2

First, a configuration of sound reproduction device 100*a* according to Embodiment 2 is described.

Figure 12:
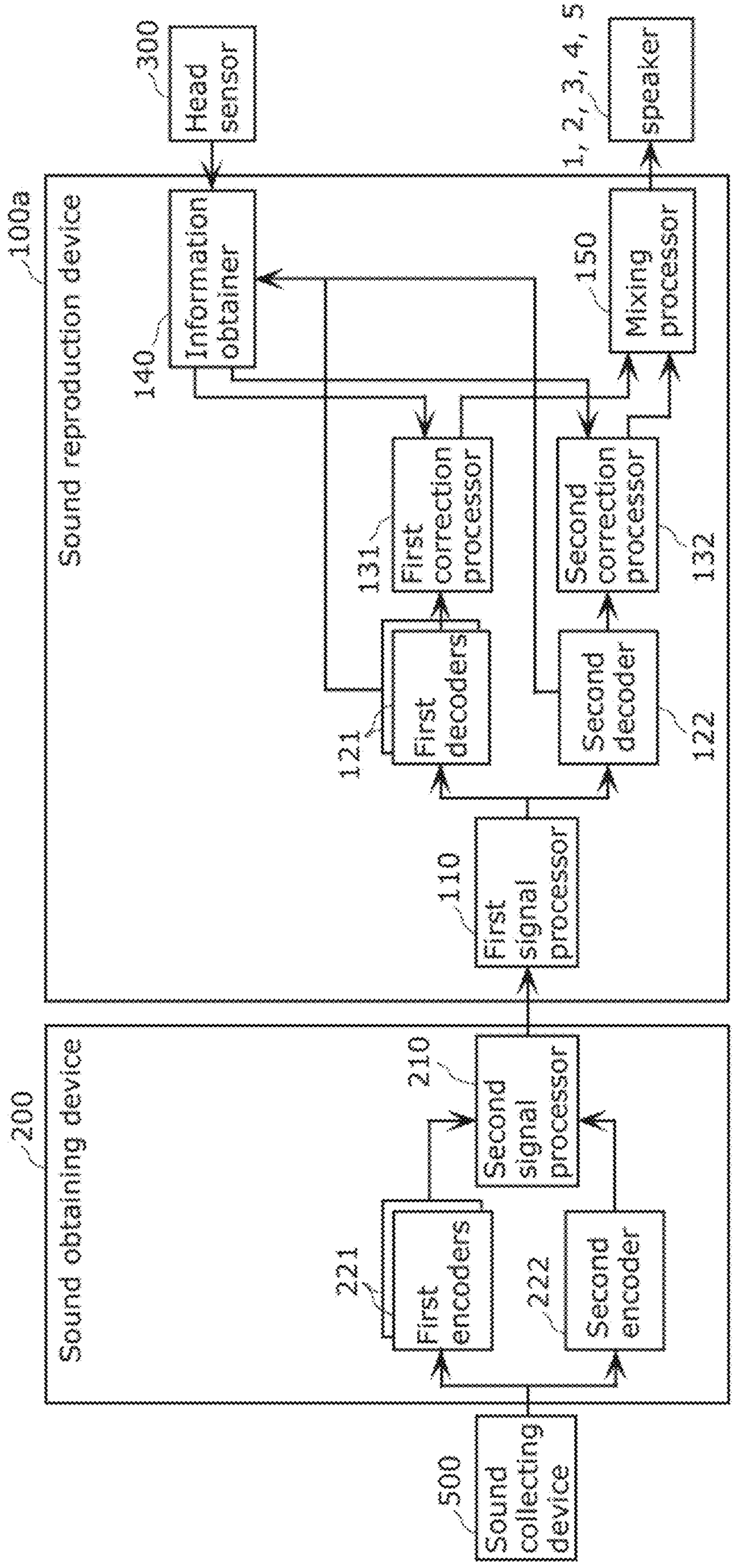
FIG. 12 is a block diagram illustrating functional configurations of a sound reproduction device and a sound obtaining device according to Embodiment 2.

FIG. 12 is a block diagram illustrating functional configurations of sound reproduction device 100*a* and sound obtaining device 200 according to this embodiment.

In this embodiment, sounds collected by sound collecting device 500 are output from speakers 1, 2, 3, 4, and 5 through sound obtaining device 200 and sound reproduction device 100*a*. More specifically, sound obtaining device 200 obtains audio signals based on the sounds collected by sound collection device 500, and outputs the audio signals to sound reproduction device 100*a*. Sound reproduction device 100*a* obtains the audio signals which have been output by sound reproduction device 200, and outputs the audio signals to speakers 1, 2, 3, 4, and 5.

Sound collecting device 500 is a device which collects sounds that arrive at sound collecting device 500, and is a microphone as one example. Sound collecting device 500 may have directivity. For this reason, sound collecting device 500 is capable of collecting sounds coming from particular directions. Sound collecting device 500 converts the collected sounds into audio signals by an A/D converter, and outputs the audio signals to sound obtaining device 200. It is to be noted that plural sound collecting devices 500 may be provided.

Sound collecting device 500 is further described with reference to FIG. 13.

Figure 13:
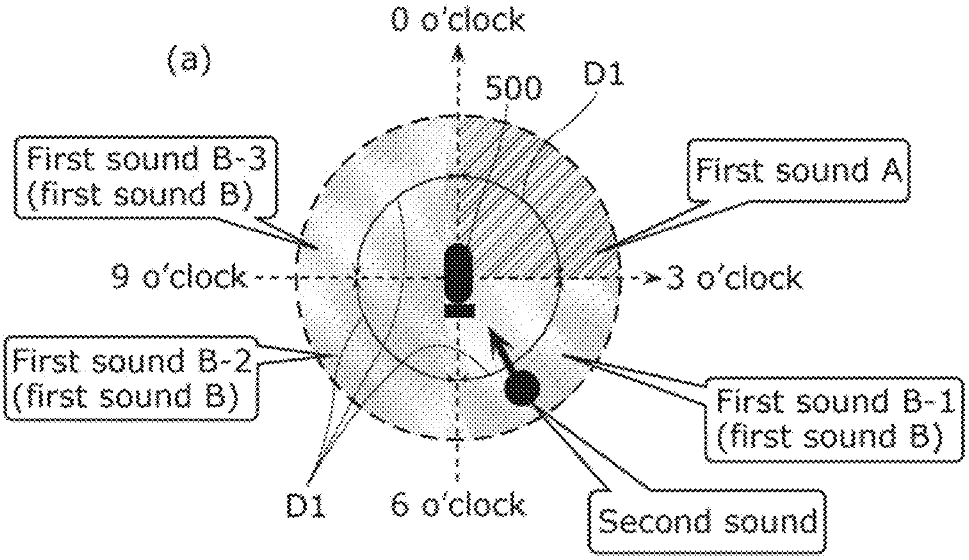
FIG. 13 is a schematic diagram explaining sound collection that is performed by a sound collecting device according to Embodiment 2.

FIG. 13 is a schematic diagram for explaining sound collection by sound collecting device 500 according to this embodiment.

In FIG. 13 as in FIG. 2, 0 o'clock, 3 o'clock, 6 o'clock, and 9 o'clock are indicated correspondingly to points of time on the face of a clock in order to explain directions. Sound collecting device 500 are located at the center (also referred to as the origin) of the face of the clock, and collects sounds which arrive at sound collecting device 500. Hereinafter, the direction in which sound collecting device 500 and 0 o'clock are aligned on the face of the clock may be referred to as the "0 o'clock direction". This also applies to the other points of time on the face of the clock.

Sound collecting device 500 collects plural first sounds and a second sound.

Here, sound collecting device 500 collects four first sounds as the plural first sounds. In order to distinguish each of the first sounds from the others, it is to be noted that the four first sounds are described as first sound A, first sound B-1, first sound B-2, and first sound B-3.

Since sound collecting device 500 is capable of collecting sounds in particular directions, as one example, the range around sound collecting device 500 is divided into four subranges, and a sound is collected for each of the subranges. Here, the range around sound collecting device 500 is divided into the following four subranges: the range from the 0 o'clock direction to the 3 o'clock direction; the range from the 3 o'clock direction to the 6 o'clock direction; the range from the 6 o'clock direction to the 9 o'clock direction; and the range from the 9 o'clock direction to the 0 o'clock direction.

In this embodiment, each of the plural first sounds is a sound which arrives at sound collecting device 500 from first range D1 which is a predetermined angle range. In other words, each first sound is a sound collected by sound collecting device 500 from a correspond one of plural first ranges D1. It is to be noted that each first range D1 corresponds to one of the four ranges.

Specifically, as illustrated in FIG. 13, first sound A is a sound which arrives from first range D1 which is a range between the 0 o'clock direction and the 3 o'clock direction to sound collecting device 500. In other words, first sound A is a sound collected from first ranges D1 between the 0 o'clock direction and the 3 o'clock direction. Likewise, first sound B-1, first sound B-2, and first sound B-3 are sounds which arrive at sound collecting device 500 respectively from first range D1 between the 3 o'clock direction and the 6 o'clock direction, first range D1 between the 6 o'clock direction and the 9 o'clock direction, and first range D1 between the 9 o'clock direction and the 0 o'clock direction. In short, first sound B-1, first sound B-2, and first sound B-3 are sounds collected respectively from three first ranges D1. It is to be noted that first sound B-1, first sound B-2, and first sound B-3 may be collectively referred to as first sounds B.

Here, first sound A is a sound which arrives from the entirety of a shaded region in FIG. 13 and arrives at listener L. Likewise, first sound B-1, first sound B-2, and first sound B-3 are sounds which arrive at listener L from the dotted region in FIG. 13. This also applies to the case in FIG. 14.

A second sound is a sound which arrives at sound collecting device 500 from a predetermined direction (here, the 5 o'clock direction). The second sound may be collected for each subrange as in the case of the plural first sounds.

Furthermore, a description is given of the relationship between the sounds collected by sound collecting device 500 and the sounds which are output from speakers 1, 2, 3, 4, and 5. Speakers 1, 2, 3, 4, and 5 output sounds in such a manner that the sounds collected by sound collecting device 500 are reproduced. In other words, in this embodiment, listener L and sound collecting device 500 are both arranged at the origin, and thus the second sound which arrives at sound collecting device 500 from the predetermined direction is received by listener L as the sound which arrives at listener L from the predetermined direction. Likewise, first sound A which arrives at sound collecting device 500 from first range D1 (the range between the 0 o'clock direction to the 3 o'clock direction) is received by listener L as the sound which arrives at listener L from first range D1.

Sound collecting device 500 outputs the plural audio signals to sound obtaining device 200. The plural audio signals include plural first audio signals indicating plural first sounds and a second audio signal indicating a second sound. In addition, the plural first audio signals include a first audio signal indicating first sound A and a first audio signal indicating first sound B. More specifically, the first audio signals indicating first sounds B include three first audio signals respectively indicating first sound B-1, first sound B-2, and first sound B-3.

Sound obtaining device 200 obtains the plural audio signals which have been output by sound collecting device 500. It is to be noted that sound obtaining device 200 may obtain classification information at this time.

Classification information is information regarding classification of plural first audio signals based on frequency characteristics of each of the plural first audio signals. In other words, in the classification information, the plural first audio signals are classified into different groups each having different frequency characteristics, based on the frequency characteristics.

In this embodiment, first sound A and first sounds B are sounds of mutually different kinds, and have different frequency characteristics. For this reason, the first audio signal indicating first sound A and the first audio signals indicating first sounds B are classified into the different groups.

In other words, the first audio signal indicating first sound A is classified into one of the groups, and three first audio signals respectively indicating first sound B-1, first sound B-2, and first sound B-3 are classified into the other one of the groups.

In addition, sound obtaining device 200 may generate such classification information based on obtained plural audio signals instead of obtaining such classification information. In other words, the classification information may be generated by a processor which is included in sound obtaining device 200 but is not illustrated in FIG. 13.

Next, constituent elements of sound obtaining device 200 are described. As illustrated in FIG. 12, sound obtaining device 200 includes encoders (plural first encoders 221 and second encoder 222) and second signal processor 210.

Encoders (plural first encoders 221 and second encoder 222) obtain audio signals which have been output by sound collecting device 500 and classification information. The encoders encode the audio signals after obtaining them. More specifically, first encoders 221 obtain and encode plural first audio signals, and second encoder 222 obtains and encodes a second audio signal. First encoders 221 and second encoder 222 perform encoding processes based on the above-described MPEG-H 3D Audio, or the like.

Here, it is excellent that each of first encoders 221 is associated one to one with a corresponding one of first audio signals classified into different groups indicated by the classification information. Each of first encoders 221 encodes the associated corresponding one of the first audio signals. For example, two groups are indicated in the classification information (the two groups are a group to which the first audio signal indicating first sound A has been classified and a group to which the first audio signal indicating first sound B has been classified). For this reason, here, two first encoders 221 are provided. One of two first encoders 221 encodes the first audio signal indicating first sound A, and the other of two first encoders 221 encodes the first audio signal indicating first sound B. It is to be noted that when sound obtaining device 200 includes single first encoder 221, single first encoder 221 obtains and encodes the first audio signals.

Each of the encoders outputs the encoded first audio signals or the encoded second audio signal corresponding to the encoder, and the classification information of the signal (s).

Second signal processor 210 obtains the encoded first audio signals, the encoded second audio signal, and the classification information. Second signal processor 210 handles the encoded first audio signals and the encoded second audio signal as the encoded audio signals. The encoded audio signals are what is called multiplexed audio signals. It is to be noted that although second signal processor 210 is for example a multiplexer in this embodiment, but second signal processor 210 is not limited the multiplexer.

Second signal processor 210 outputs the audio signals which are encoded bitstreams and the classification information to sound reproduction device 100*a* (more specifically, first signal processor 110).

As for the processes which are performed by sound reproduction device 100*a*, the differences from the processes in Embodiment 1 are mainly described. It is to be noted that sound reproduction device 100*a* includes plural first decoders 121 in this embodiment. This is a difference from sound reproduction device 100 in Embodiment 1.

First signal processor 110 obtains the audio signals and the classification information which have been output, and performs a process of separating the audio signals into plural first audio signals and a second audio signal. First signal processor 110 outputs the separated first audio signal and classification information to first decoders 121, and outputs the separated second audio signal and classification information to second decoder 122.

First decoders 121 obtain and decode the first audio signals separated by first signal processor 110.

Here, it is excellent that each of first decoders 121 is associated one to one with a corresponding one of first audio signals classified into different groups indicated by classification information. Each of first decoders 121 decodes the associated corresponding one of the first audio signals. As in first encoders 221, two first decoders 121 are provided here. One of two first decoders 121 decodes a first audio signal indicating first sound A, and the other of two first decoders 121 decodes a first audio signal indicating first sound B. It is to be noted that when sound reproduction device 100*a* includes single first decoder 121, single first decoder 121 obtains and decodes the first audio signals.

First decoders 121 output the decoded first audio signals and classification information to first correction processor 131. In addition, second decoder 122 outputs the decoded second audio signal and classification information to correction processor 132.

Furthermore, first correction processor 131 obtains (i) the first audio signals and the classification information which have been obtained by first decoders 121, and (ii) direction information, and first information and second information which have been obtained by information obtainer 140.

Likewise, second correction processor 132 obtains (i) the second audio signal and the classification information which have been obtained by second decoders 122, and (ii) direction information, and first information and second information which have been obtained by information obtainer 140.

It is to be noted that the first information according to this embodiment includes information indicating single first range D1 relating to first sounds A included in the first audio signals and three first ranges D1 relating to first sounds B.

Figure 14:
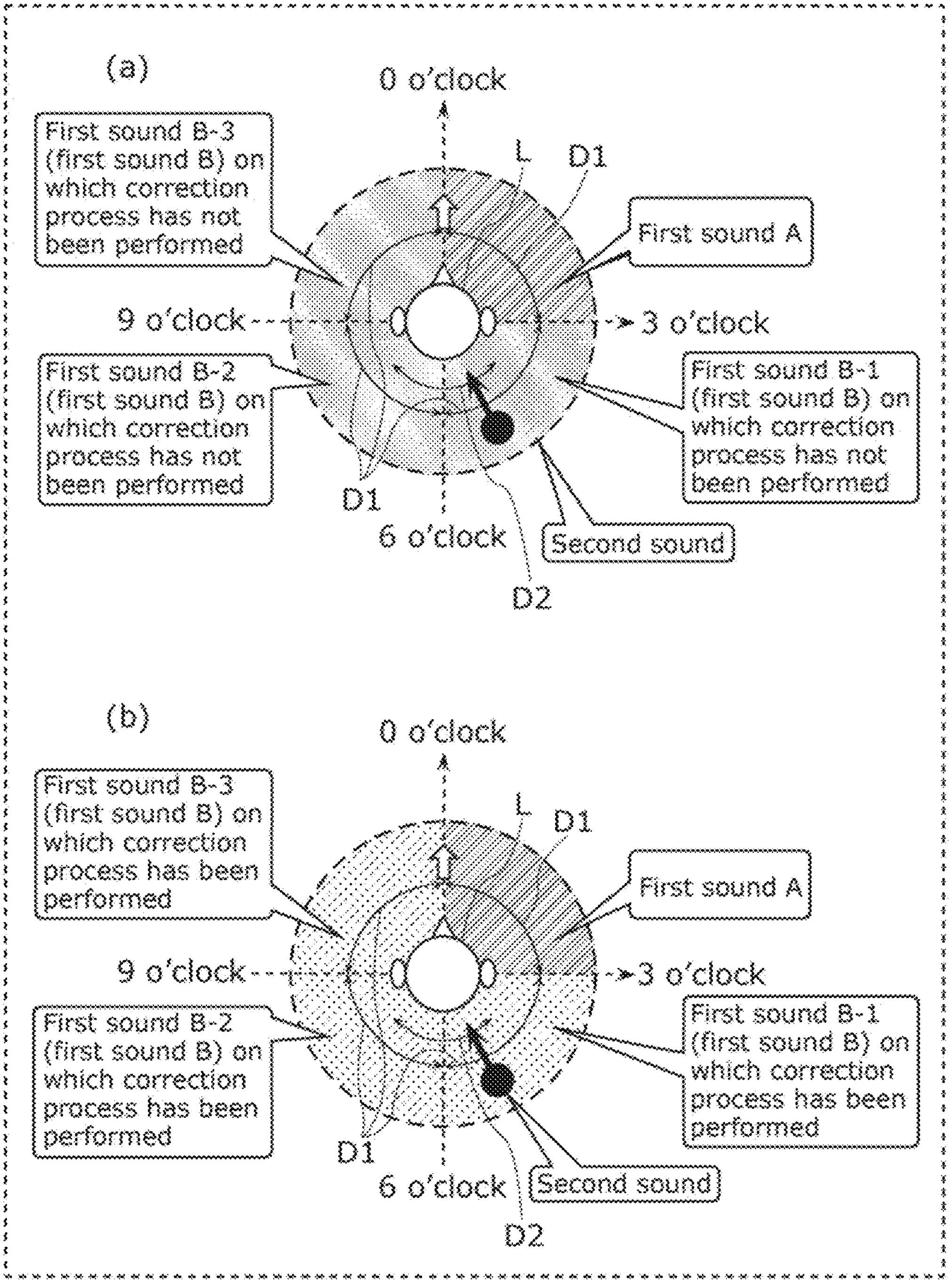
FIG. 14 is a schematic diagram illustrating one example of a correction process that is performed on first audio signals according to Embodiment 2.

Next, a correction process which is performed by the correction processor is described with reference to FIG. 14. FIG. 14 is a schematic diagram indicating one example of a correction process performed on first audio signals according to this embodiment. In FIG. 14, (a) illustrates an example in which no correction process has been performed, and (b) illustrates an example in which a correction process has been performed.

In this embodiment, the correction processor performs a correction process based on direction information and classification information. Here, a description is given of a case in which the correction processor has determined that one first range D1 among plural first ranges D1 and a predetermined direction are included in second range D2. In this case, the correction processor performs a correction process on at least one of a single first audio signal indicating a single first sound or a second audio signal which arrive at listener L from single first range D1. More specifically, based on the classification information, the correction processor performs the correction process on at least one of (i) all the first audio signals classified into the same group to which the single first audio signal has been classified or (ii) the second audio signal.

For example, in FIG. 14, the correction processor determines that first range D1 (the range located between the 3 o'clock direction and the 6 o'clock direction) and a predetermined direction (the 5 o'clock direction) are included in second range D2 (the range located between the 4 o'clock direction and the 8 o'clock direction). The sound that arrives at listener L from first range D1 is first sound B-1. All the first audio signals classified into the same group to which the first audio signal indicating first sound B-1 is classified are three first audio signals respectively indicating first sound B-1, first sound B-2, and first sound B-3.

In other words, the correction processor performs the correction process on at least one of the three first audio signals respectively indicating first sound B-1, first sound B-2, and first sound B-3 (in other words, first audio signals indicating first sounds B) or the second audio signal.

In this way, the correction processor is capable of performing a correction process for each of the groups to each of which a corresponding one of the first audio signals is classified. Here, the correction processor is capable of performing the correction process on the three first audio signals indicating first sound B-1, first sound B-2, and first sound B-3 all together. For this reason, the processing load of the correction processor can be reduced.

Other Embodiments

Although the sound reproduction device and the sound reproduction method according to the aspects of the present disclosure have been described based on the embodiments, the present disclosure is not limited to the embodiments. For example, another embodiment that is implemented by optionally combining any of the constituent elements indicated in the present DESCRIPTION or removing some of the constituent element may be obtained as an embodiment of the present disclosure. Furthermore, the present disclosure covers and encompasses variations obtainable by adding, to any of the above embodiments, various kinds of modifications that a person skilled in the art may arrive at within the spirit of the present disclosure, that is the meaning indicated by the wordings recited in the claims.

In addition, one or more aspects of the present disclosure may cover and encompass the embodiments indicated below.

(1) A part of the constituent elements of the above-described sound reproduction device may be a computer system including a microprocessor, a ROM, a RAM, a hard disk unit, a display unit, a keyboard, a mouse, and so on. A computer program is stored in the RAM or the hard disc unit. The respective devices achieve their functions through the microprocessor's operations according to the computer program. Here, the computer program is configured by combining plural instruction codes indicating instructions for the computer.

(2) A part of the constituent elements of the sound reproduction device and a part of the elements of the sound reproduction method may be configured with a system LSI (large scale integration). The system LSI is a super-multi-function LSI manufactured by integrating structural units on a single chip, and is specifically a computer system configured to include a microprocessor, a ROM, a RAM, and so on. A computer program is stored in the RAM. The system LSI achieves its function through the microprocessor's operations according to the computer program.

(3) A part of the constituent elements of the sound reproduction device may be configured as an IC card which can be attached to and detached from the respective devices. The IC card or the module is a computer system configured from a microprocessor, a ROM, a RAM, and so on. The IC card or the module may also include the above-described super-multi-function LSI. The IC card or the module achieves its functions through the microprocessor's operations according to the computer program. The IC card or the module may also be implemented to be tamper-resistant.

Furthermore, a part of the sound reproduction device may also be implemented as computer programs or digital signals recorded on computer-readable media such as a flexible disc, a hard disk, a CD-ROM, an MO, a DVD, a DVD-ROM, a DVD-RAM, a BD (Blu-ray Disc), and a semiconductor memory. Furthermore, a part of the sound reproduction device may also be implemented as the digital signals recorded on these media.

Furthermore, a part of the sound reproduction device may also be implemented as the computer programs or digital signals transmitted via a telecommunication line, a wireless or wired communication line, a network represented by the Internet, a data broadcast, and so on.

(5) The present disclosure may relate to the above-described methods. Furthermore, each of the methods may be a computer program which is executed by a computer, or digital signals of the computer program.

(6) Furthermore, the present disclosure may also be implemented as a computer system including a microprocessor and a memory, in which the memory stores the computer program and the microprocessor operates according to the computer program.

(7) Furthermore, it is also possible to execute another independent computer system by transmitting the program or the digital signals recorded on the media, or by transmitting the program or the digital signals via the network, and the like.

(8) Any of the embodiments and variations may be combined.

Alternatively, although not illustrated in FIG. 2, etc., a video may be presented to listener L together with a sound that is output from speakers 1, 2, 3, 4, and 5. In this case, for example, a display device such as a liquid-crystal panel, an electro luminescent (EL) panel, and the like may be provided, so that the video is presented onto the display device. Alternatively, the video may be presented by listener L wearing a head mounted display.

Although five speakers 1, 2, 3, 4, and 5 are provided as illustrated in FIG. 2 in the above Embodiment, it is to be noted that the number of speakers is not limited to five. For example, a 5.1-channel surround system in which five speakers 1, 2, 3, 4, and 5 and a speaker that supports Subwoofer may be used. Alternatively, a multi-channel surround system in which two speakers are provided may be used, but available systems are not limited thereto.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The present disclosure is applicable to sound reproduction devices and sound reproduction methods, and is particularly applicable to stereophonic sound reproduction systems.

The invention claimed is:

1. A sound reproduction method comprising:

obtaining a first audio signal and a second audio signal, the first audio signal indicating a first sound which arrives at a listener from a first range which is a predetermined angle range, the second audio signal indicating a second sound which arrives at the listener from a predetermined direction;

obtaining direction information which is information about a direction that a head part of the listener faces;

performing a correction process when the first range and the predetermined direction are determined to be included in a second range based on the direction information obtained, the second range being a back range relative to a front range in the direction that the head part of the listener faces, the correction process being performed on at least one of the first audio signal obtained or the second audio signal obtained so that intensity of the second audio signal becomes higher than intensity of the first audio signal; and performing mixing of the at least one of the first audio signal or the second audio signal which has undergone the correction process, and outputting, to an output channel, the first audio signal and the second audio signal which have undergone the mixing.

2. The sound reproduction method according to claim 1, wherein the first range is a back range relative to a reference direction which is defined based on a position of the output channel.

3. The sound reproduction method according to claim 1, wherein the correction process is a process of correcting one of a gain of the first audio signal obtained and a gain of the second audio signal obtained.

4. The sound reproduction method according to claim 1, wherein the correction process is at least one of a process of decreasing a gain of the first audio signal obtained or a process of increasing a gain of the second audio signal obtained.

5. The sound reproduction method according to claim 1, wherein the correction process is a process of correcting at least one of frequency components based on the first audio signal obtained or frequency components based on the second audio signal obtained.

6. The sound reproduction method according to claim 1, wherein the correction process is a process of making a spectrum of frequency components based on the first audio signal obtained to be smaller than a spectrum of frequency components based on the second audio signal obtained.

7. The sound reproduction method according to claim 1, wherein, in the performing of the correction process, the correction process is performed based on a positional relationship between the second range and the predetermined direction, and the correction process is either a process of correcting at least one of a gain of the first audio signal obtained or a gain of the second audio signal obtained, or a process of correcting at least one of frequency characteristics based on the first audio signal obtained or frequency characteristics based on the second audio signal obtained.

8. The sound reproduction method according to claim 7, wherein, when the second range is divided into a back-right range which is a range located back-right of the listener, a back-left range which is a range located back-left of the listener, and a back-center range which is a range located back-center of the listener, the performing of the correction process is:

performing either a process of decreasing a gain of the first audio signal obtained or a process of increasing a gain of the second audio signal obtained, when the predetermined direction is determined to be included in either the back-right range or the back-left range; and performing a process of decreasing a gain of the first audio signal obtained and a process of increasing a gain of the second audio signal obtained, when the predetermined direction is determined to be included in the back-center range.

9. The sound reproduction method according to claim 1, wherein, the obtaining of the first audio signal and the second audio signal is obtaining (i) a plurality of first audio signals indicating a plurality of first sounds and the second audio signal and (ii) classification information about groups into which the plurality of first audio signals have been respectively classified, in the performing of the correction process, the correction process is performed based on the direction information obtained and the classification information obtained, and the plurality of first sounds are sounds collected respectively from a plurality of first ranges.

10. A sound reproduction method comprising:

obtaining a plurality of first audio signals and a second audio signal, the plurality of first audio signals indicating a plurality of first sounds which arrive at a listener from a plurality of first ranges which are a plurality of predetermined angle ranges, the second audio signal indicating a second sound which arrives at the listener from a predetermined direction;

obtaining direction information which is information about a direction that a head part of the listener faces;

performing a correction process when the plurality of first ranges and the predetermined direction are determined to be included in a second range based on the direction information obtained, the second range being a back range relative to a front range in the direction that the head part of the listener faces, the correction process being performed on at least one of (i) the plurality of first audio signals obtained or (ii) the second audio signal obtained so that intensity of the second audio signal becomes higher than intensity of the plurality of first audio signals; and performing mixing of the at least one of (i) the plurality of first audio signals or (ii) the second audio signal which has undergone the correction process, and outputting, to an output channel, the plurality of first audio signals and the second audio signal which have undergone the mixing, wherein the plurality of first sounds are sounds collected respectively from the plurality of first ranges.

11. A non-transitory medium having a computer-readable computer program recorded thereon for causing a computer to execute the sound reproduction method according to claim 1.

12. A sound reproduction device comprising:

a signal obtainer which obtains a first audio signal and a second audio signal, the first audio signal indicating a first sound which arrives at a listener from a first range which is a predetermined angle range, the second audio signal indicating a second sound which arrives at the listener from a predetermined direction;

an information obtainer which obtains direction information which is information about a direction that a head part of the listener faces;

a correction processor which performs a correction process when the first range and the predetermined direction are determined to be included in a second range based on the direction information obtained, the second range being a back range relative to a front range in the direction that the head part of the listener faces, the correction process being performed on at least one of the first audio signal obtained or the second audio signal obtained so that intensity of the second audio signal becomes higher than intensity of the first audio signal; and a mixing processor which performs mixing of the at least one of the first audio signal or the second audio signal which has undergone the correction process, and outputting, to an output channel, the first audio signal and the second audio signal which have undergone the mixing.

* * * * *